US 10,628,990 B2

United States Patent
Kaplan

(10) Patent No.: US 10,628,990 B2
(45) Date of Patent: Apr. 21, 2020

(54) REAL-TIME SYSTEM AND METHOD FOR RENDERING STEREOSCOPIC PANORAMIC IMAGES

(71) Applicant: Intel Corporation, Santa Clara, CA (US)

(72) Inventor: Adam Kaplan, Ramle (IL)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 16/116,373

(22) Filed: Aug. 29, 2018

(65) Prior Publication Data

US 2020/0074716 A1  Mar. 5, 2020

(51) Int. Cl.
| | | |
|---|---|---|
| G06T 5/50 | (2006.01) | |
| G06T 15/06 | (2011.01) | |
| H04N 13/344 | (2018.01) | |
| G06T 15/10 | (2011.01) | |
| H04N 13/00 | (2018.01) | |

(52) U.S. Cl.
CPC .............. *G06T 15/06* (2013.01); *G06T 15/10* (2013.01); *H04N 13/344* (2018.05); *H04N 2013/0088* (2013.01)

(58) Field of Classification Search
None
See application file for complete search history.

(56) References Cited

U.S. PATENT DOCUMENTS

| | | | | | |
|---|---|---|---|---|---|
| 5,226,113 | A | * | 7/1993 | Cline ...................... | G06T 17/00 345/419 |
| 5,995,742 | A | * | 11/1999 | Jannson ............... | G02B 6/0065 703/21 |
| 6,157,747 | A | * | 12/2000 | Szeliski ................. | G06K 9/209 345/419 |
| 2005/0128196 | A1 | * | 6/2005 | Popescu ................. | G01B 11/25 345/420 |
| 2008/0143709 | A1 | * | 6/2008 | Fassero ..................... | G06T 3/00 345/419 |
| 2014/0176542 | A1 | * | 6/2014 | Shohara ................ | G06T 15/205 345/420 |
| 2014/0218354 | A1 | * | 8/2014 | Park ...................... | G06T 3/4038 345/419 |
| 2016/0119541 | A1 | * | 4/2016 | Alvarado-Moya ... | G06T 3/4038 348/38 |
| 2016/0353090 | A1 | * | 12/2016 | Esteban ............. | G02B 27/0172 |

(Continued)

OTHER PUBLICATIONS

Bourke, Paul, "Calculating Stereo Pairs", Available online at <paulbourke.net/stereographics/stereorender/>, Jul. 1999, pp. 1-20.

(Continued)

*Primary Examiner* — Sultana M Zalalee
(74) *Attorney, Agent, or Firm* — Nicholson De Vos Webster & Elliott LLP

(57) ABSTRACT

A system and method for rendering stereoscopic panoramas. For example in one embodiment, vertices of geometric primitives are generated for a panoramic image. Vertices of geometric primitives are stored in a 3-D coordinate system. A vertex processor determines a final location, equivalent to latitude and longitude coordinates, for each of the vertices in a panoramic image. A rendering engine renders the panoramic image in accordance with the final location of each of the vertices.

15 Claims, 47 Drawing Sheets

(56) References Cited

U.S. PATENT DOCUMENTS

| | | | |
|---|---|---|---|
| 2017/0323469 A1* | 11/2017 | Hakura | H04N 13/275 |
| 2018/0033176 A1* | 2/2018 | Su | G06F 3/04815 |
| 2018/0144547 A1* | 5/2018 | Shakib | G06T 19/003 |
| 2018/0152682 A1* | 5/2018 | Wozniak | H04N 19/44 |
| 2018/0190007 A1* | 7/2018 | Panteleev | H04N 13/161 |
| 2019/0155372 A1* | 5/2019 | Cuervo | G02B 26/0816 |

OTHER PUBLICATIONS

Bourke, Paul, "Content Creation for Dome Displays", Available online at <http://paulbourke.net/papers/HIVE/presentation.pdf>, 2015, 84 pages.

Bourke, Paul, "Stereoscopic 3D Panoramic Images", Available online at <http://paulbourke.net/stereographics/stereopanoramic/>, May 2002, pp. 1-14.

Bourke, Paul, "Synthetic stereoscopic panoramic images", Lecture Notes in Computer Science (LNCS), vol. 4270, 2006, pp. 147-155.

Elevr, "CG & VR Part 1—Rendering Challenges", Available online at <https://web.archive.org/web/20190527184351/http://elevr.com/cg-vr-1/>, Retrieved on Dec. 10, 2019, 5 pages.

Gateau et al., "Implementing Stereoscopic 3D in Your Applications", NVIDIA, GPU Technology Conference, Sep. 20, 2010, 76 pages.

Google Inc., "Rendering Omni-directional Stereo Content", Available online at <https://developers.google.com/vr/jump/rendering-ods-content.pdf>, 2016, pp. 1-11.

Nvidia Developer, "VRWorks—360 Video", Available online at <https://developer.nvidia.com/vworks/vworks-360video>, Retrieved on Dec. 10, 2019, pp. 1-12.

Paul, Jason, "Capture, Stitch, and Stream VR Content in Real-Time with VRWorks 360 Video SDK", NVIDIA Blog, Jul. 25, 2016, 2 pages.

Reed, Paul, "Programming", Virtual Reality, Available online at <http://www.paul-reed.co.uk/programming.html>, Retrieved on Dec. 10, 2019, pp. 1-15.

Unity Asset Store, "VR Panorama 360 PRO Renderer", Available online at <https://assetstore.unity.com/packages/tools/video/vr-panorama-360-pro-renderer-35102>, Retrieved on Dec. 10, 2019, 1 page.

Unity Forum, "[Released] VR Panorama—render 360 stereo videos", Available online at <https://forum.unity.com/threads/released-vr-panorama-render-360-stereo-videos.336086/>, Retrieved on Dec. 10, 2019, pp. 1-20.

Wikipedia, "Ray tracing (graphics)", Available online at <https://en.wikipedia.org/wiki/Ray_tracing_(graphics)>, Retrieved on Dec. 10, 2019, pp. 1-15.

Wikipedia, "Stereocopy", Available online at <https://en.wikipedia.org/wiki/Stereocopy>, Retrieved on Dec. 10, 2019, pp. 1-17.

* cited by examiner

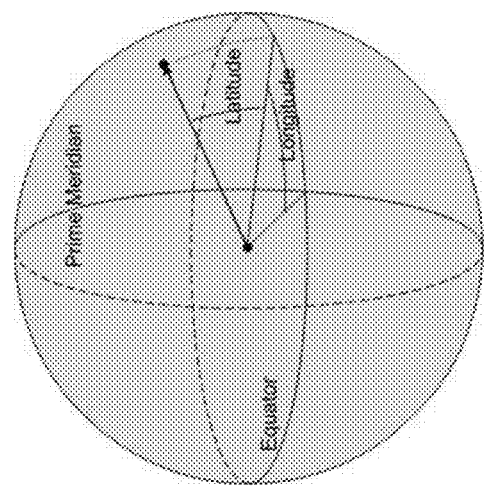
FIG. 21A
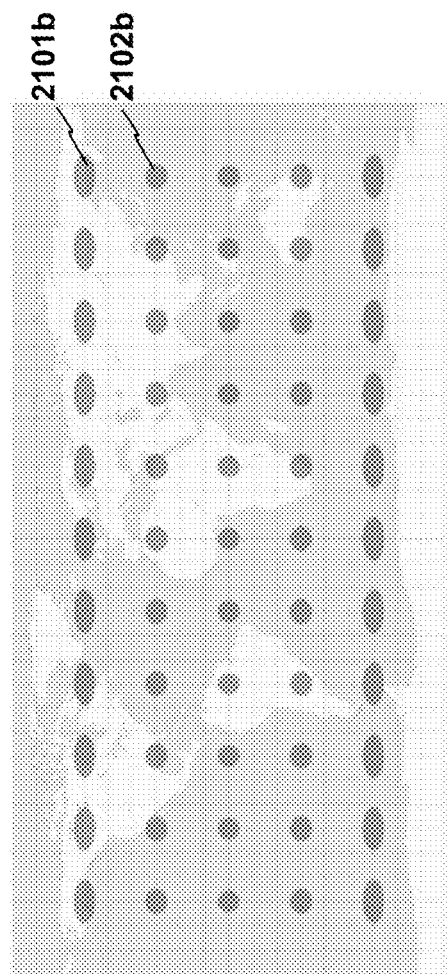
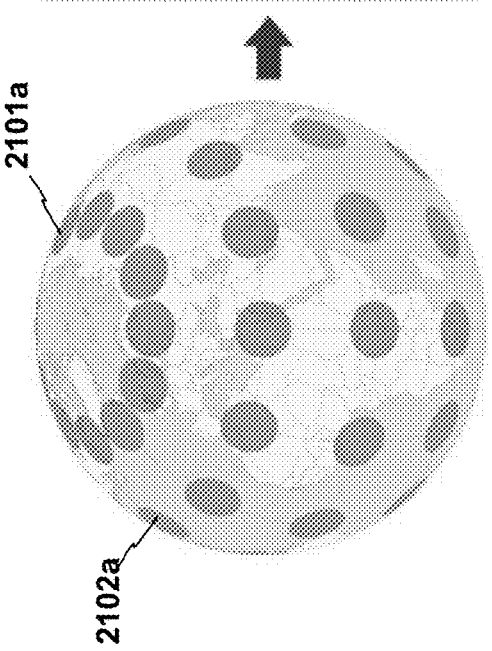
FIG. 21B

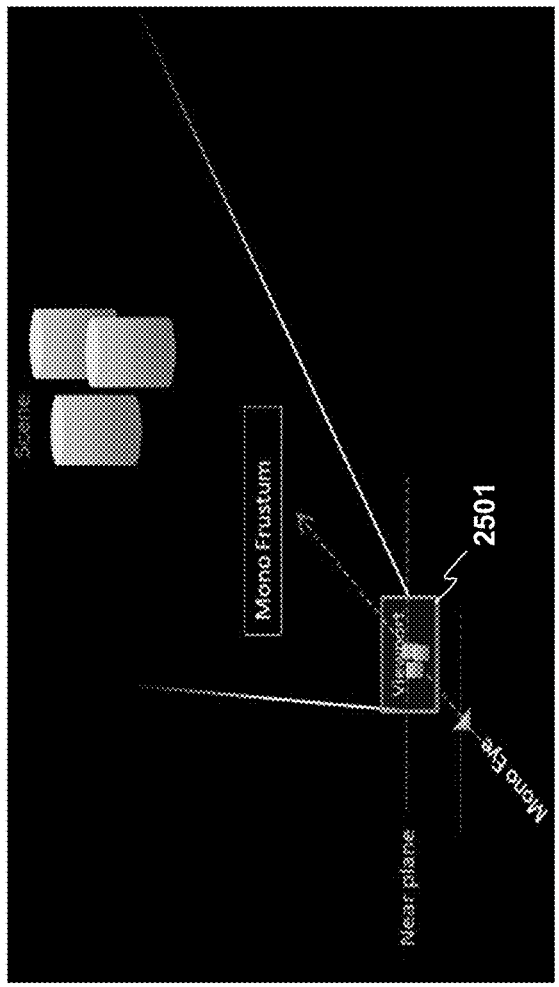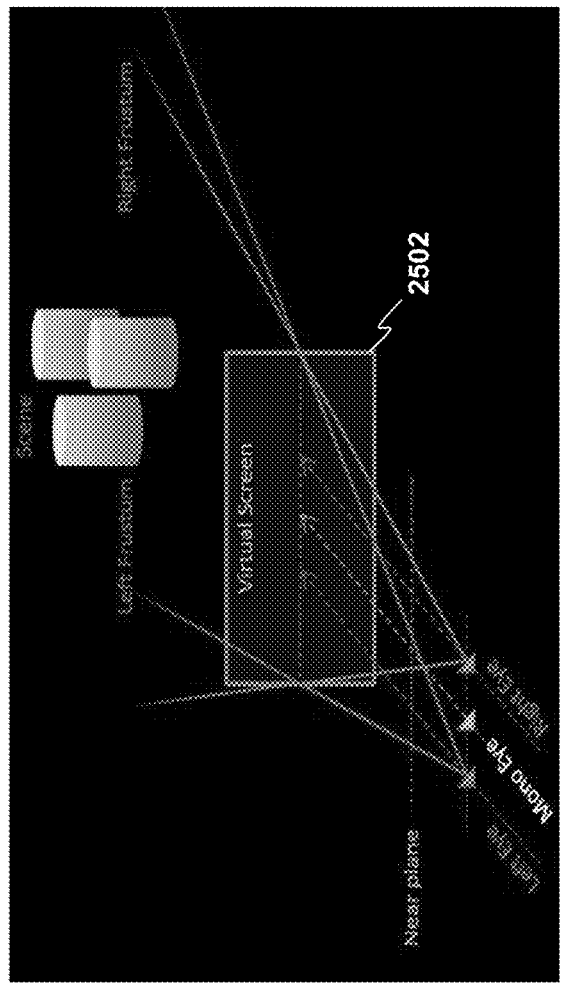

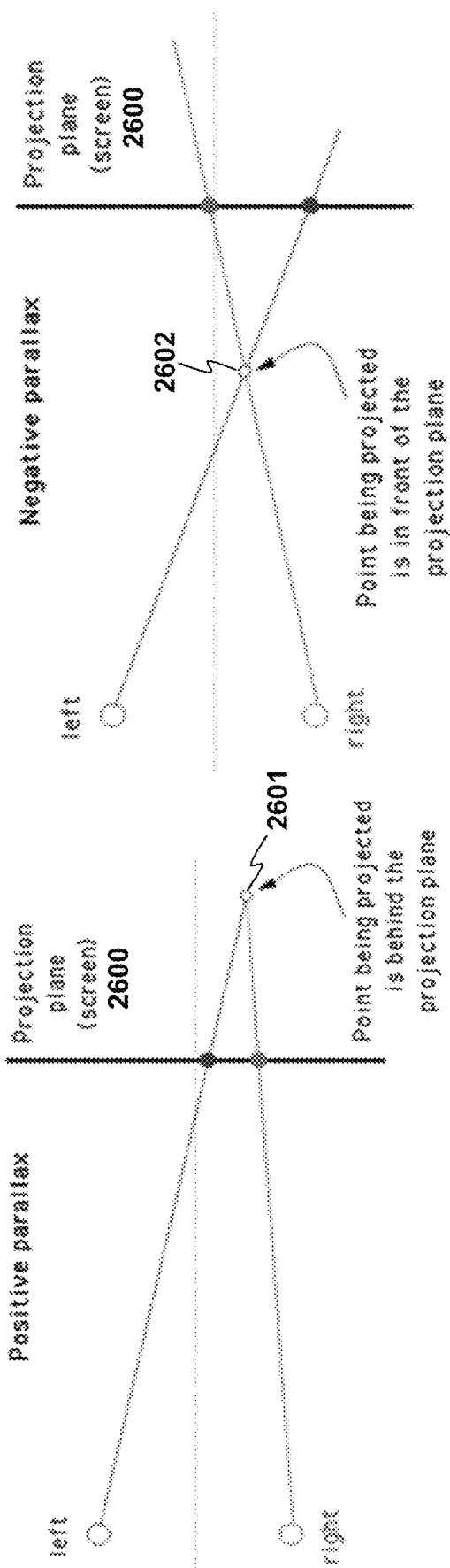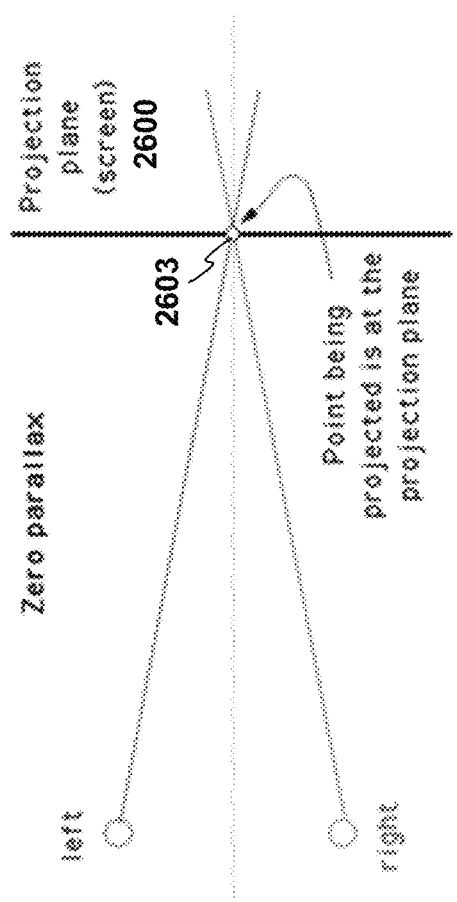
FIG. 26A
FIG. 26B
FIG. 26C

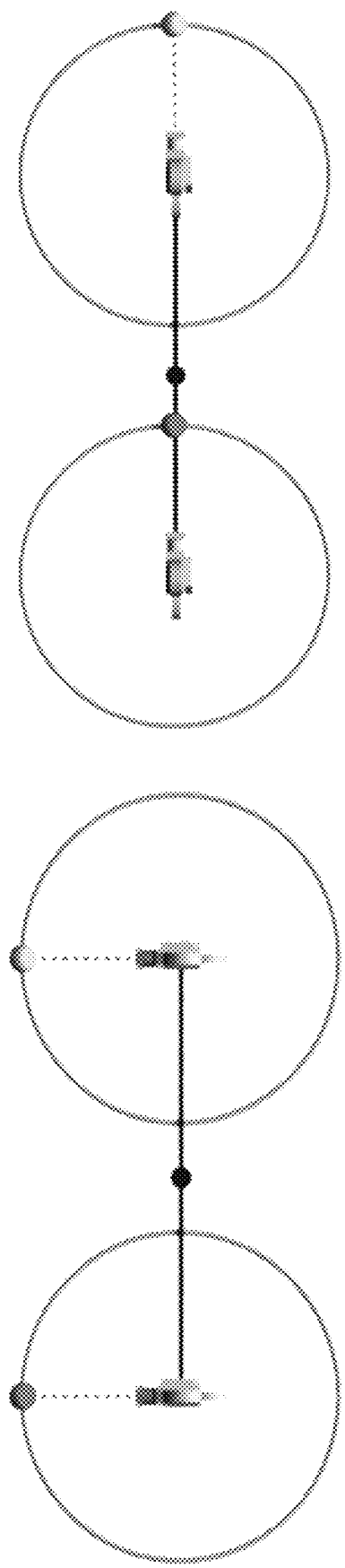
FIG. 28A
FIG. 28B
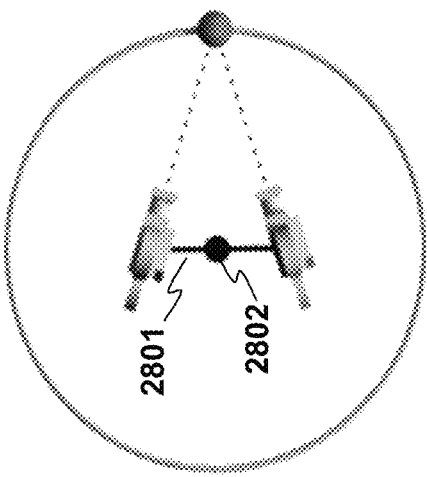
FIG. 28C

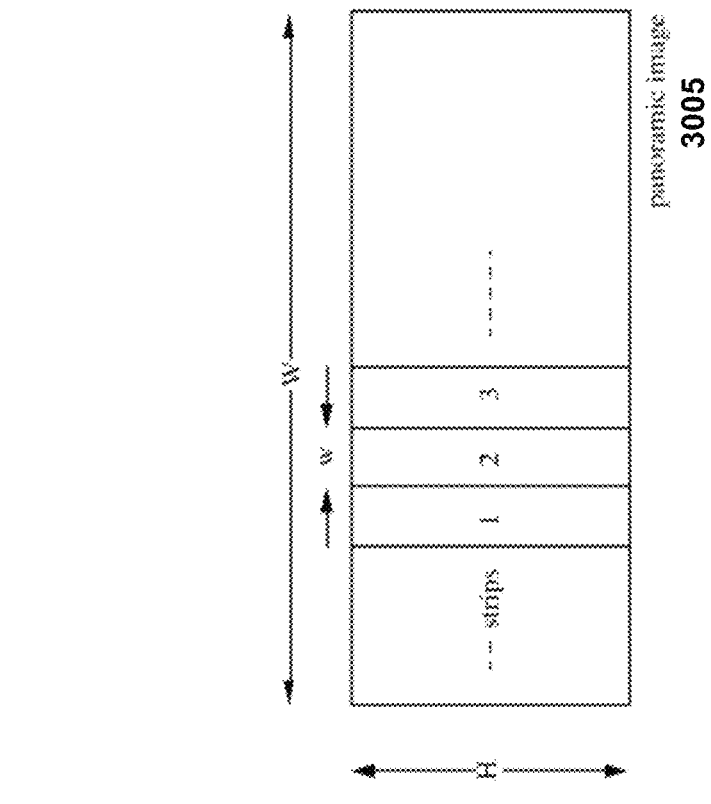
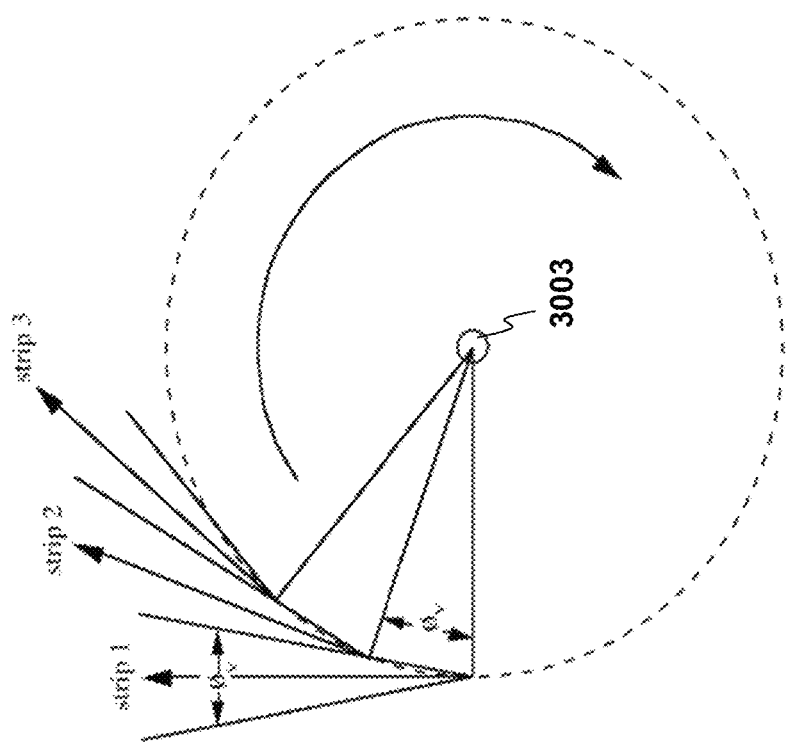
FIG. 30B

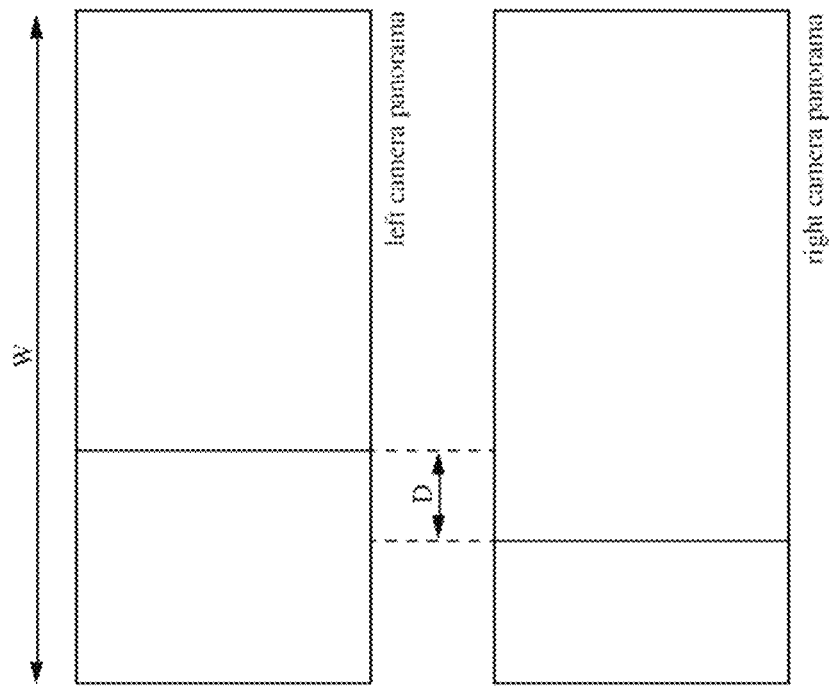
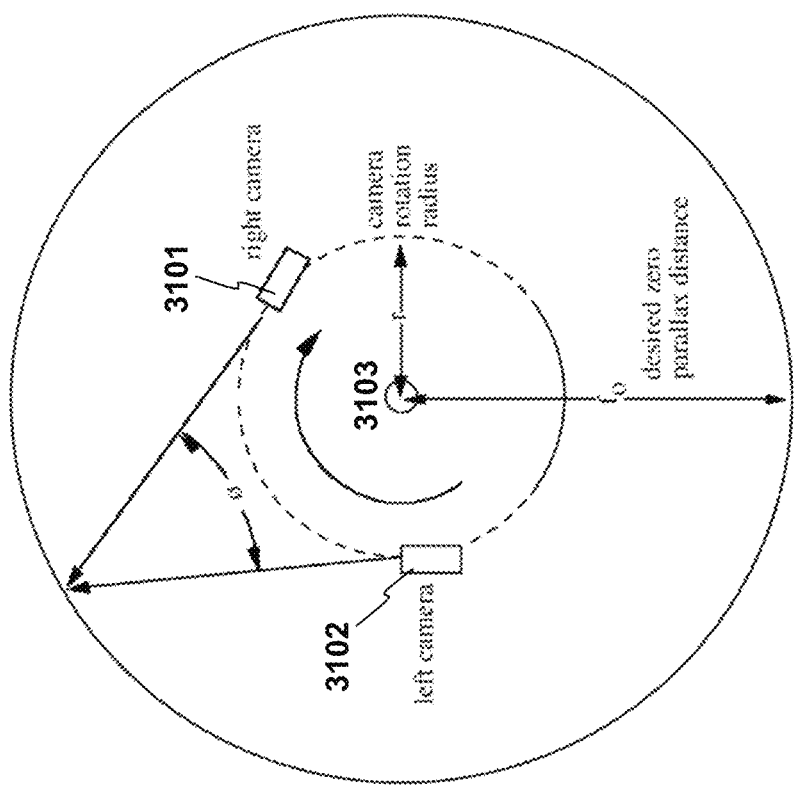
FIG. 31

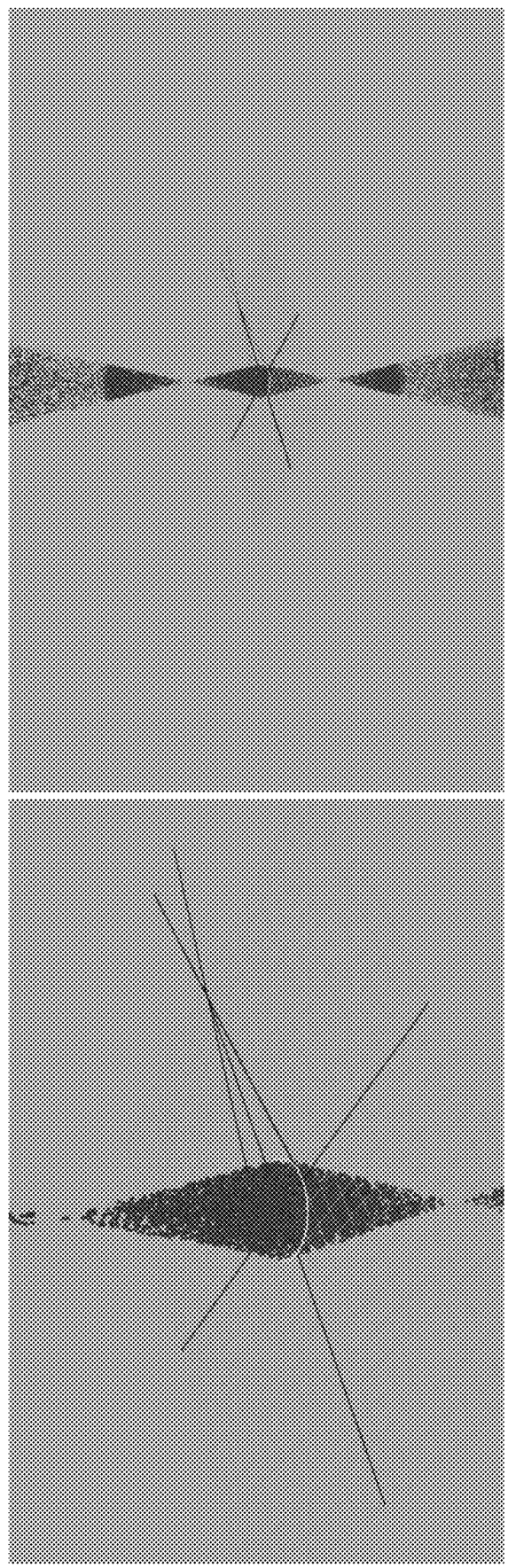

US 10,628,990 B2

REAL-TIME SYSTEM AND METHOD FOR RENDERING STEREOSCOPIC PANORAMIC IMAGES

BACKGROUND

Field of the Invention

This invention relates generally to the field of computer processors. More particularly, the invention relates to an apparatus and method for rendering stereoscopic panoramic images.

Description of the Related Art

A full 360° panoramic image is an image that fully covers the area around the camera including a 360° horizontal field-of-view and a 180° vertical field-of-view. In order to use such an image, a special viewer is needed that uses it as a texture for the sphere surrounding the camera. Such an image is typically referred to as a "Spherical Panorama" or sometimes a "Panoramic Image in Equirectangular Format."

BRIEF DESCRIPTION OF THE DRAWINGS

A better understanding of the present invention can be obtained from the following detailed description in conjunction with the following drawings, in which:

FIGS. 21A-B illustrate an example equirectangular projection;

FIGS. 25A-B illustrate stereo rendering examples;

FIGS. 26A-C illustrate positive, negative and zero parallax;

FIGS. 28A-C illustrate implementations in which stereoscopic techniques are employed twice, for the left and the right eye with a vertical shift between them;

FIG. 30B illustrates an example setup for obtaining a panoramic image for a left camera;

FIG. 31 illustrates an example which does not provide full panoramic coverage;

FIGS. 37A-B illustrate an example no-solution area;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
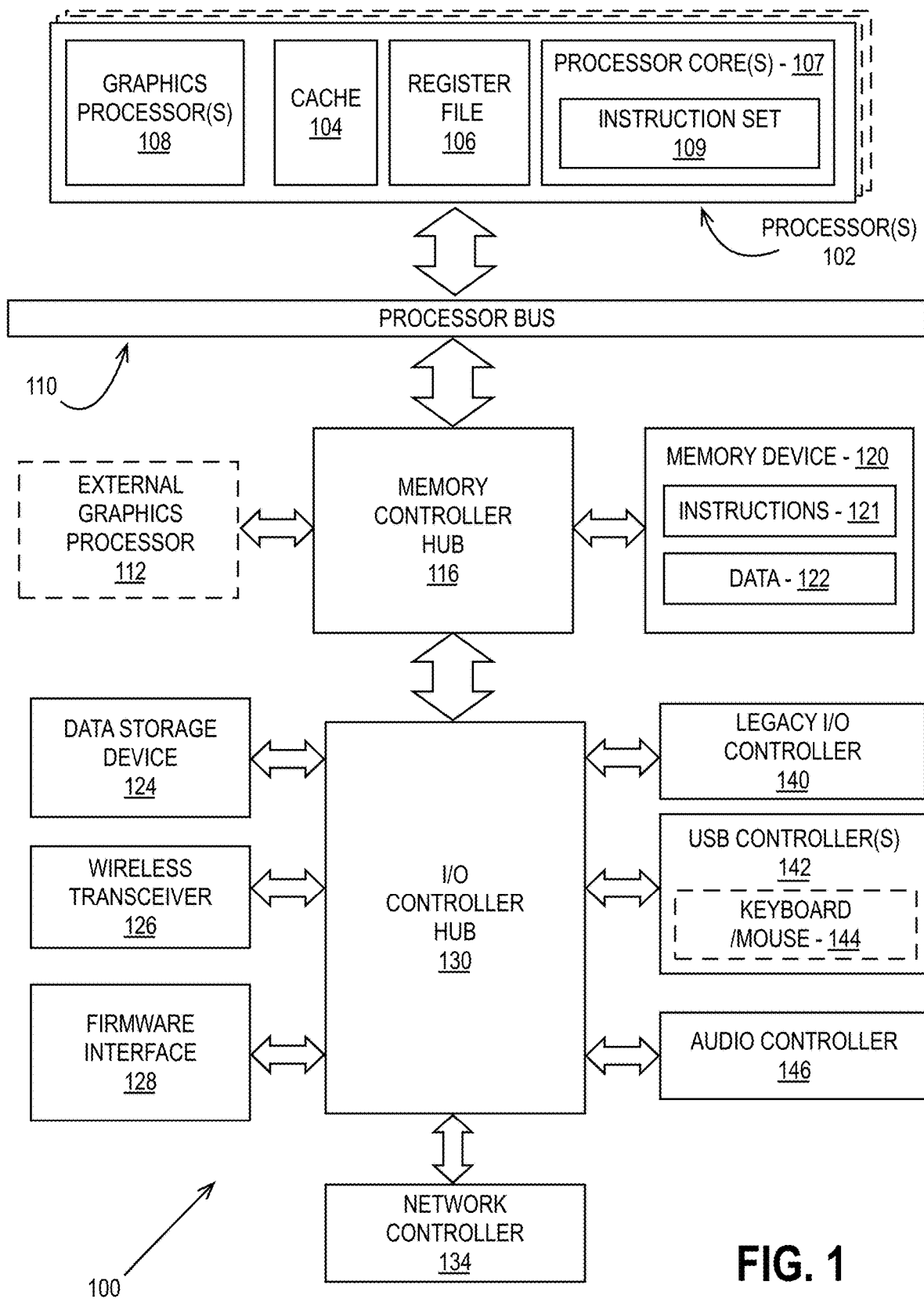
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
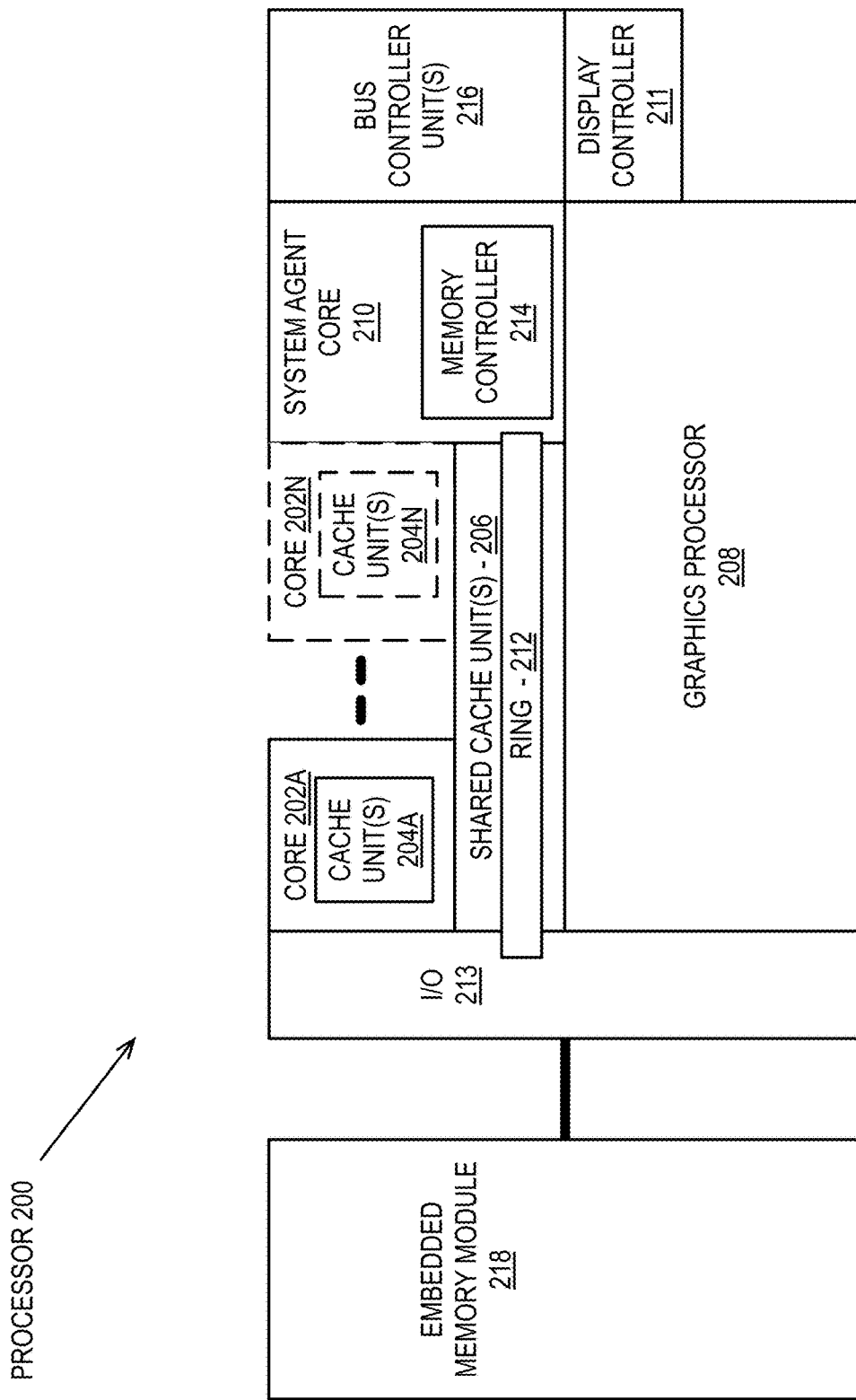
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
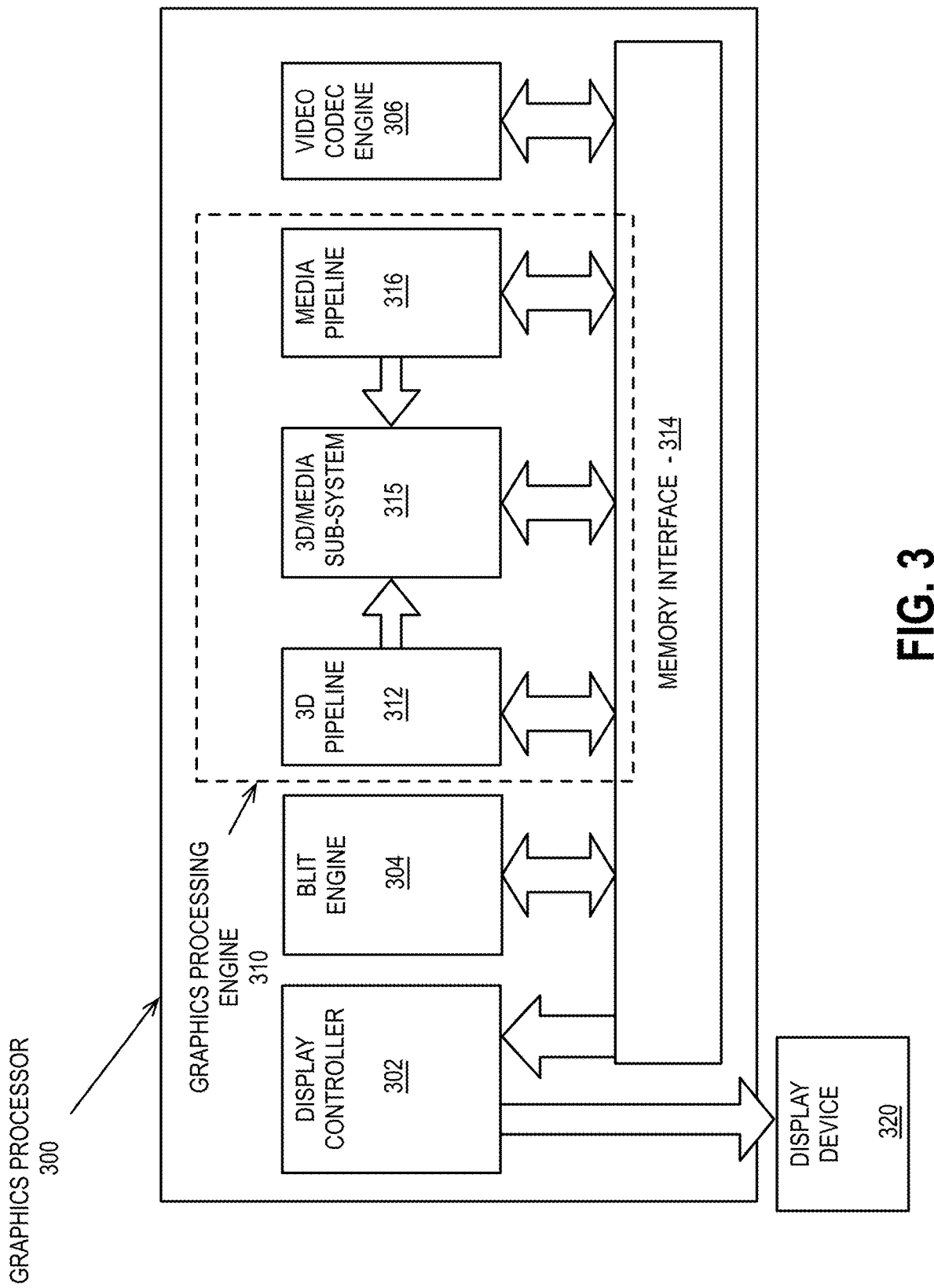
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/ MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
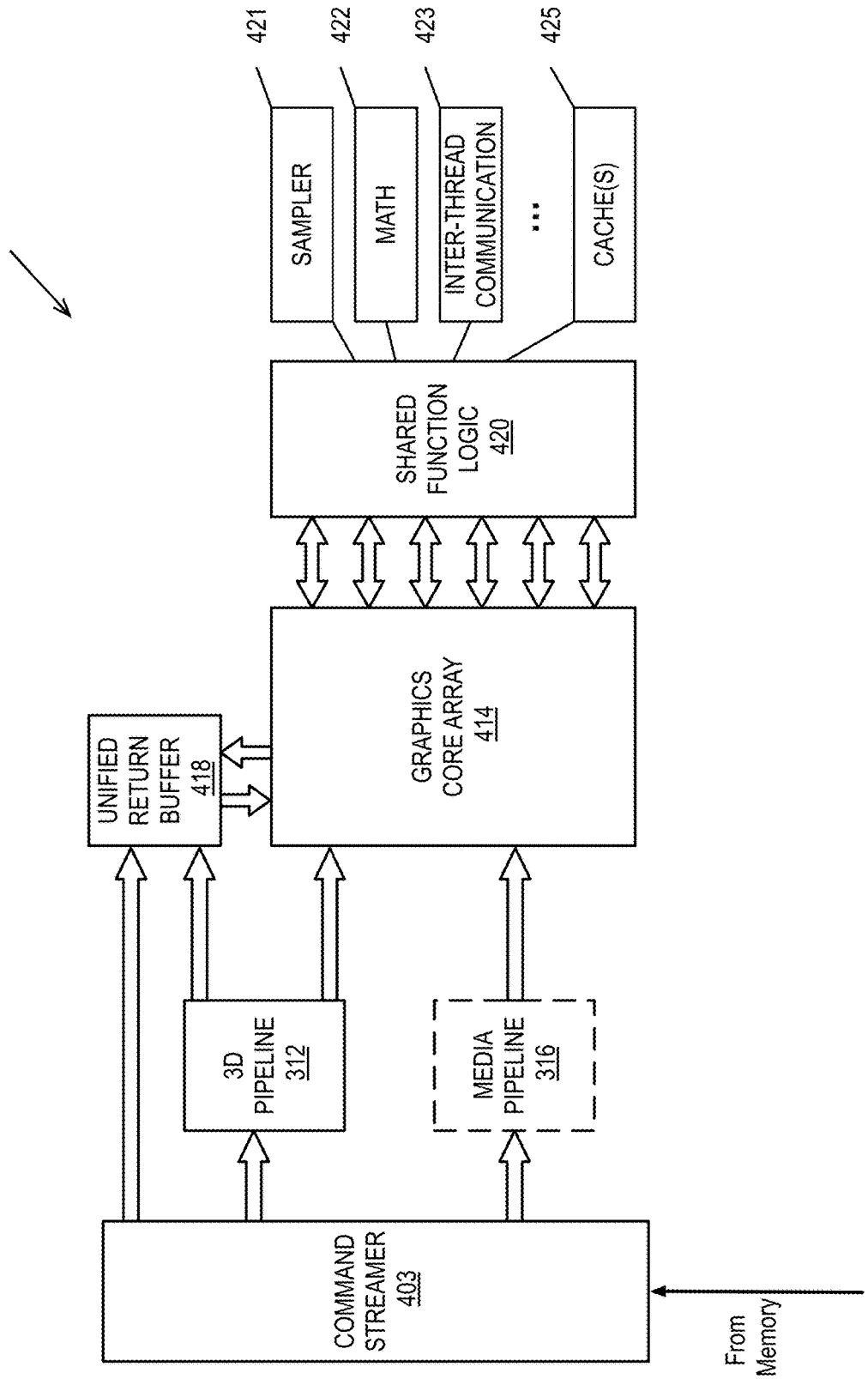
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
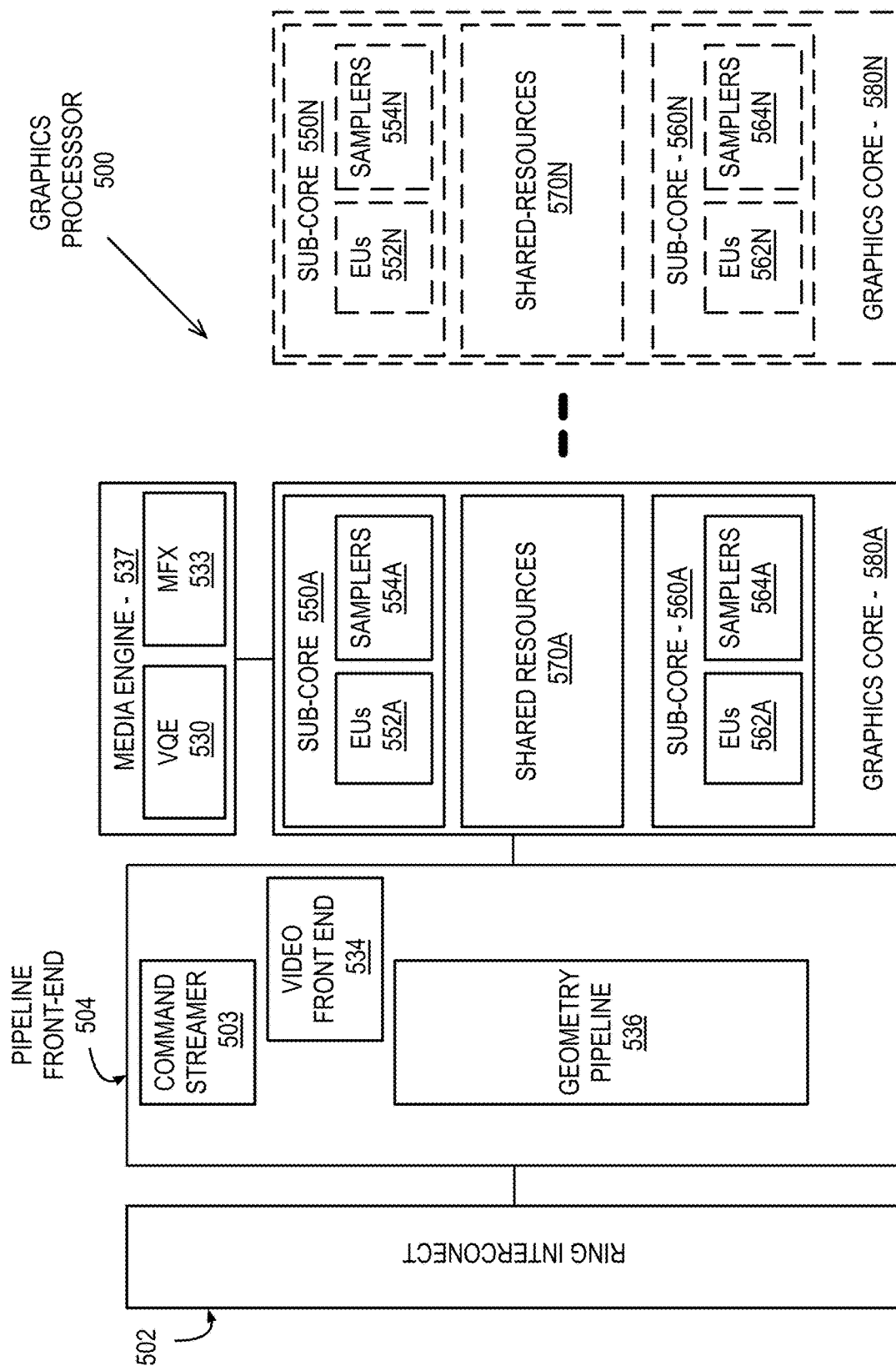
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
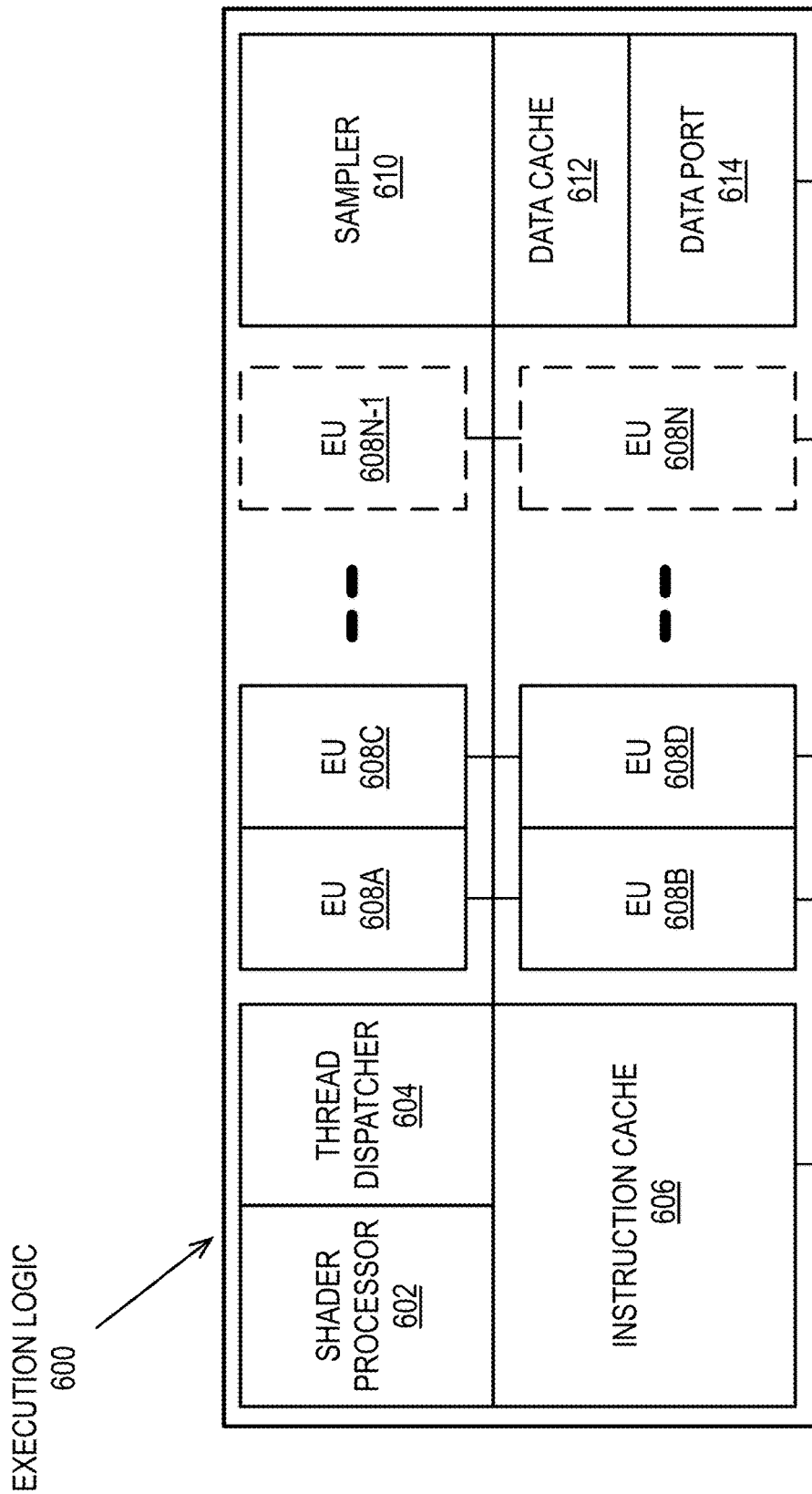
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
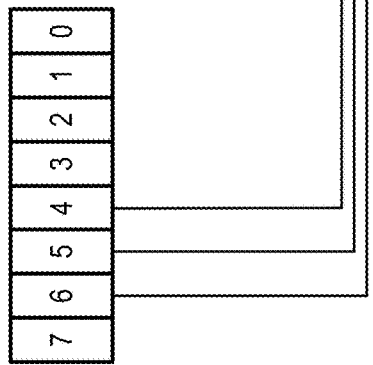
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
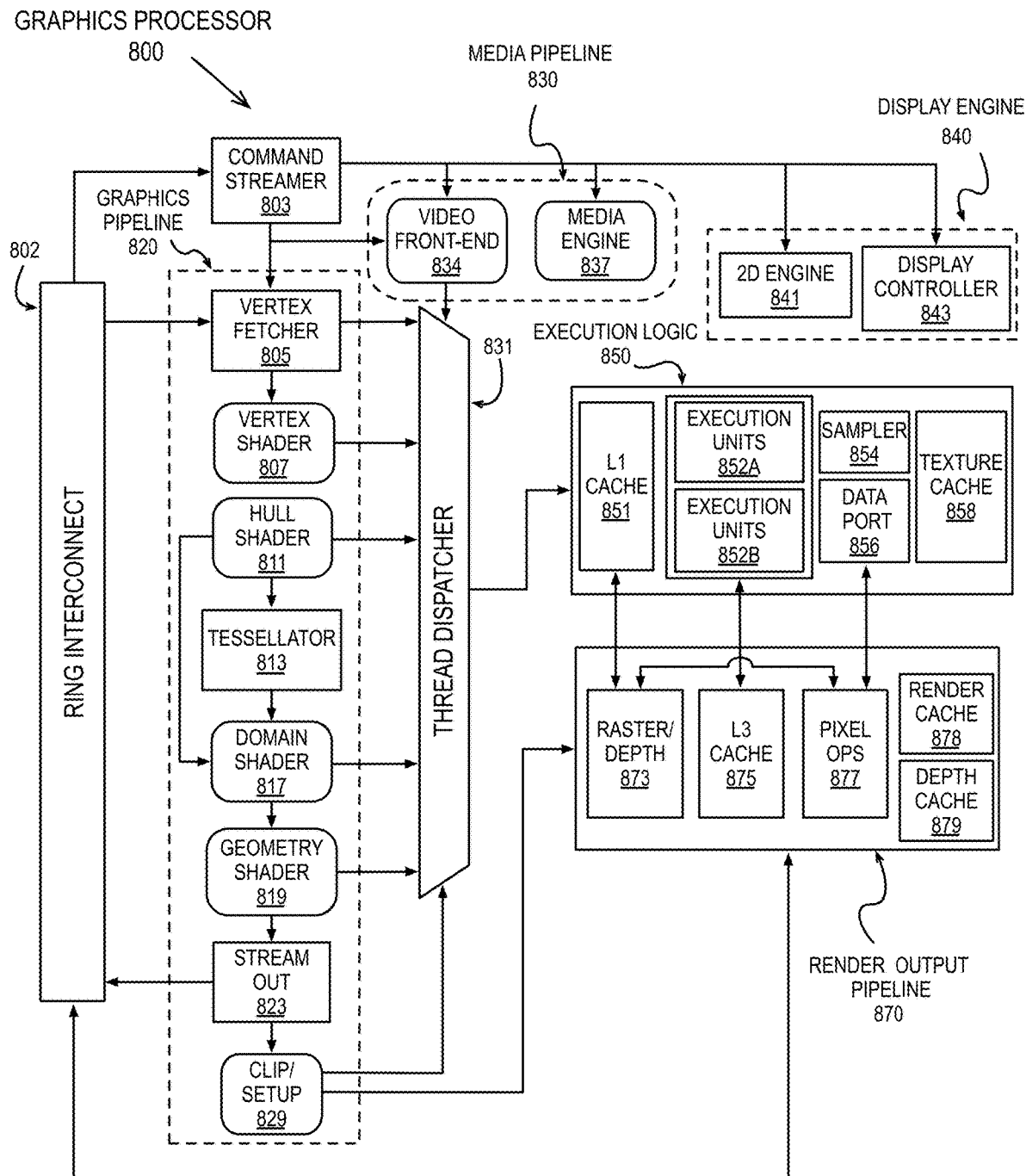
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
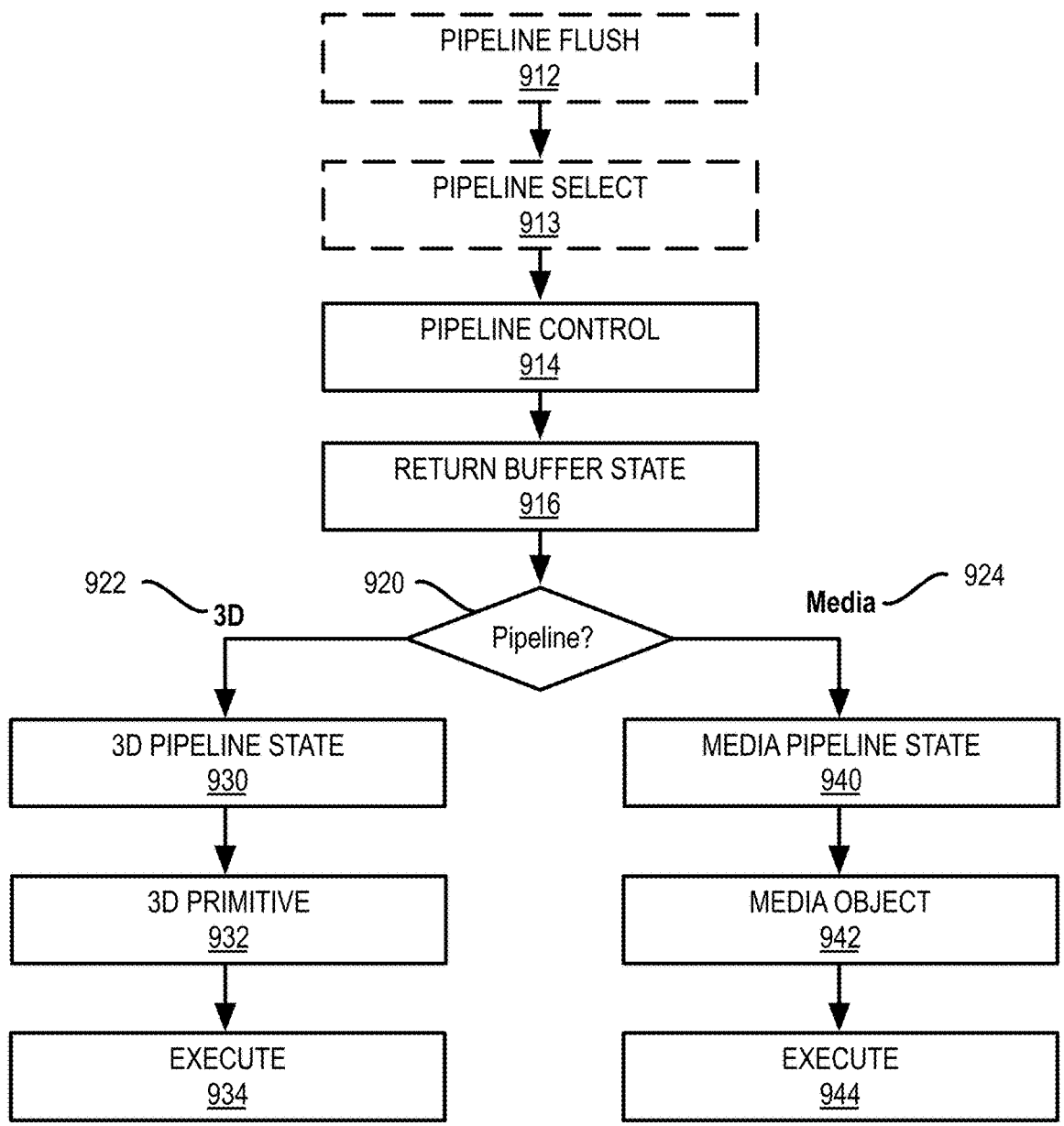
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
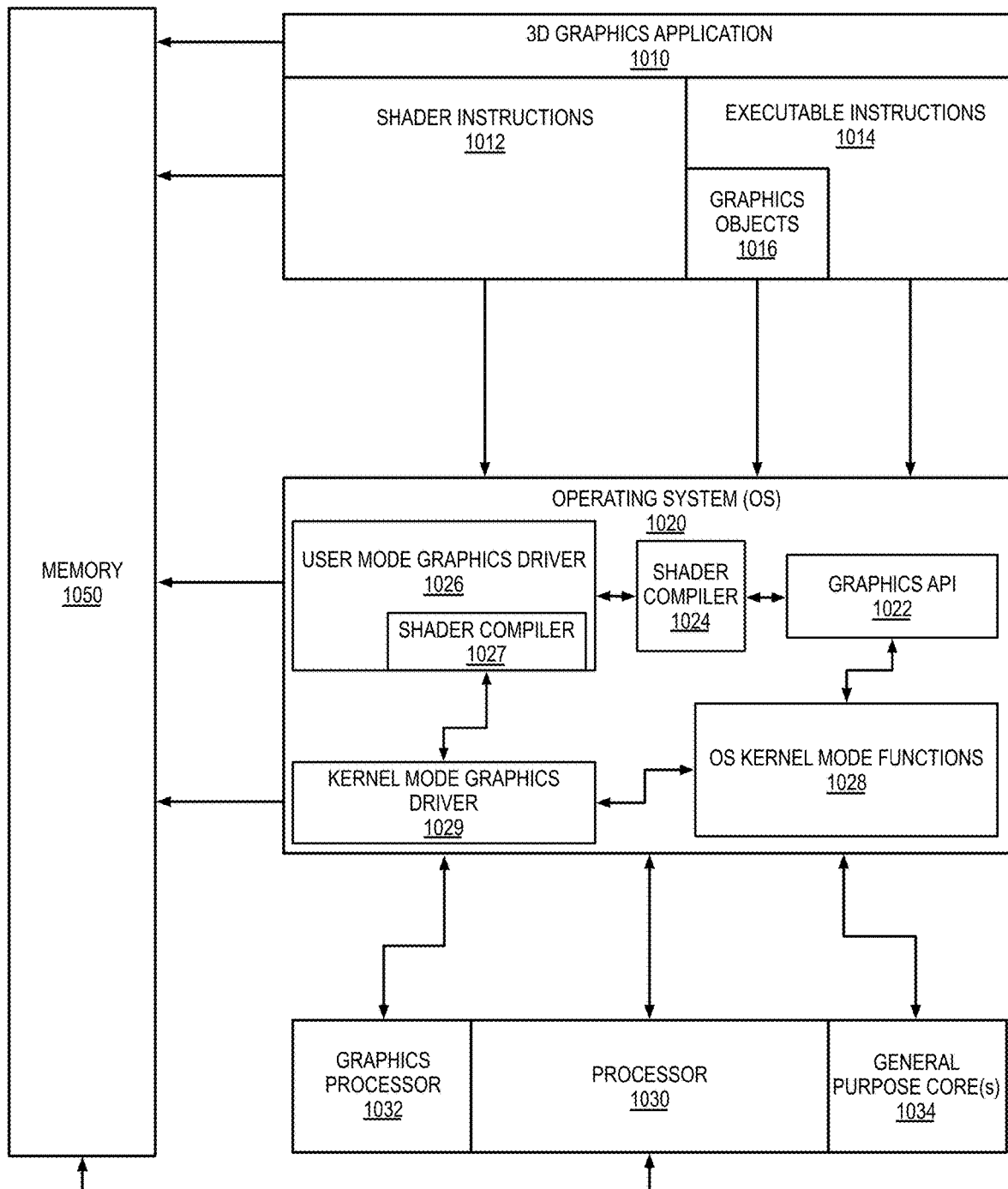
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
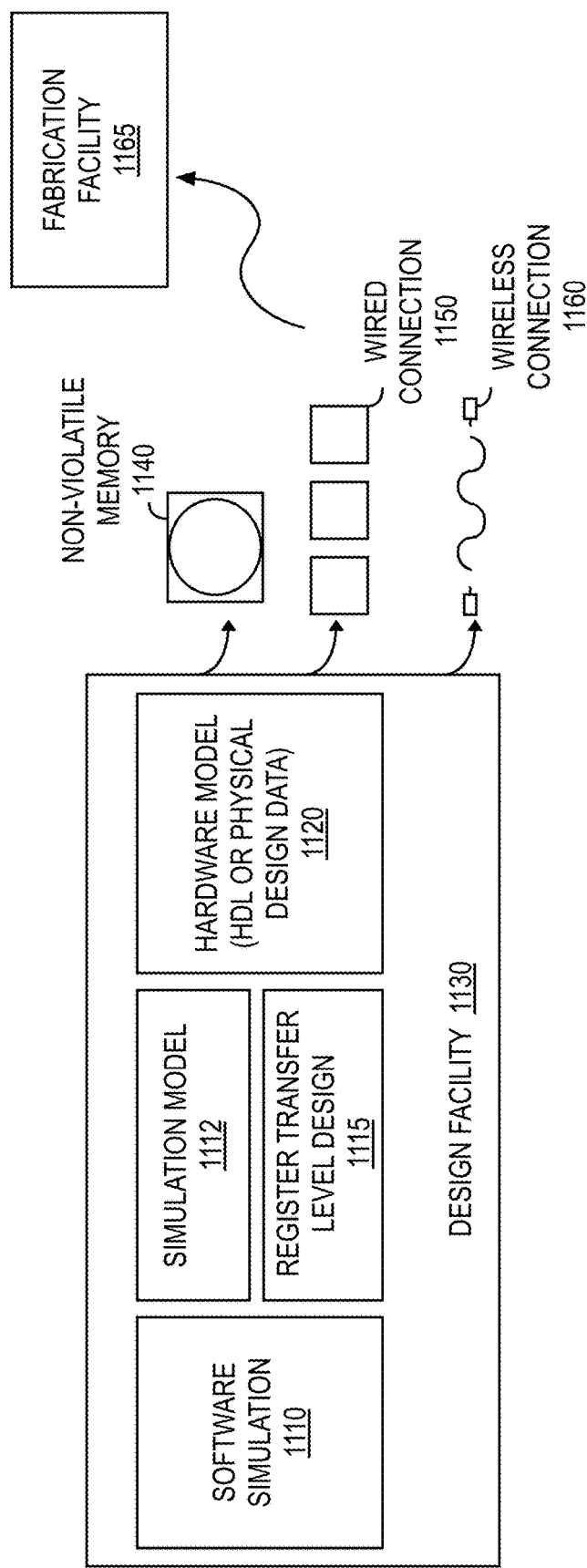
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
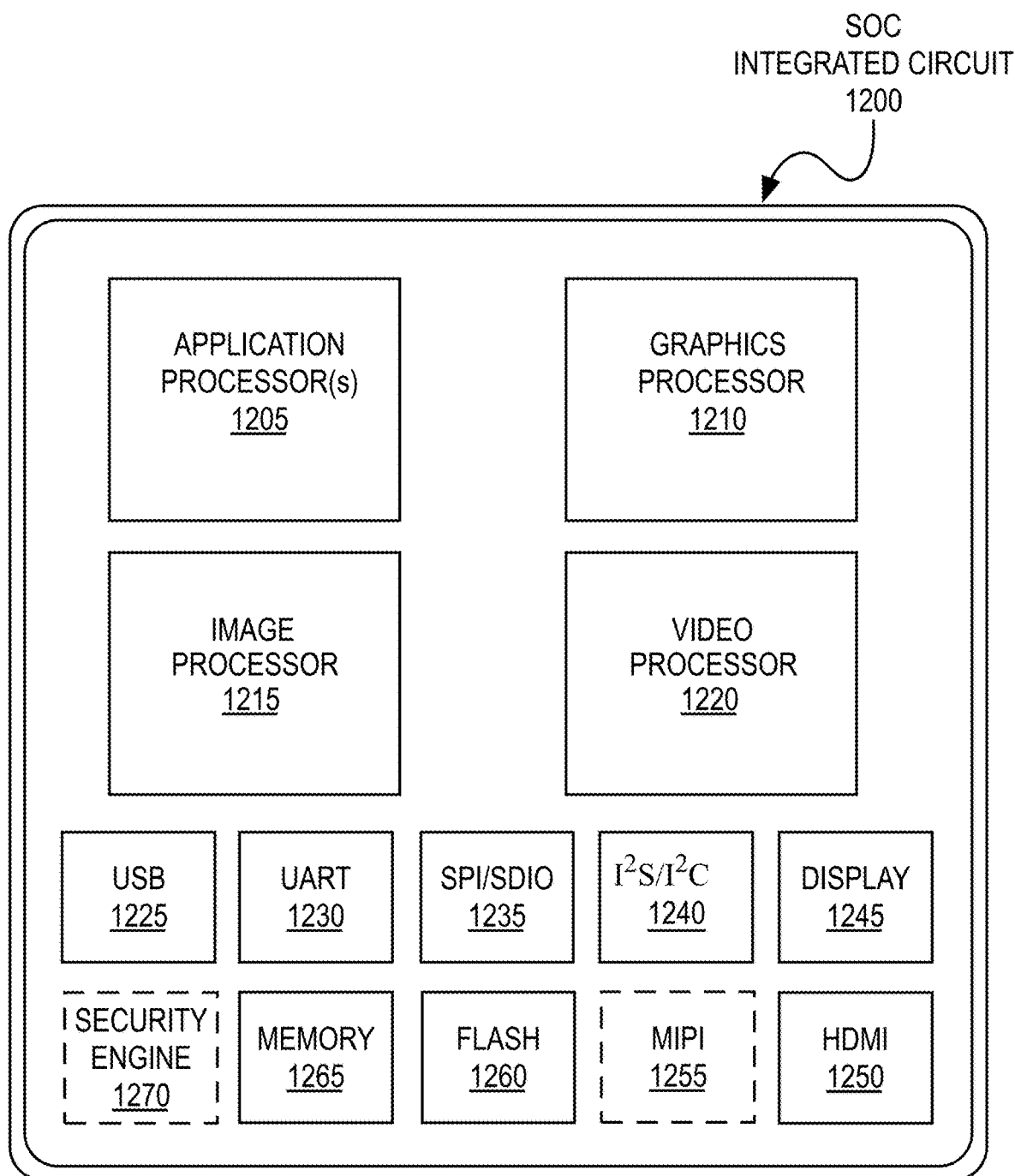
FIG. 12 illustrates an exemplary system on a chip integrated circuit that may be fabricated using one or more IP cores, according to an embodiment.
Figure 13:
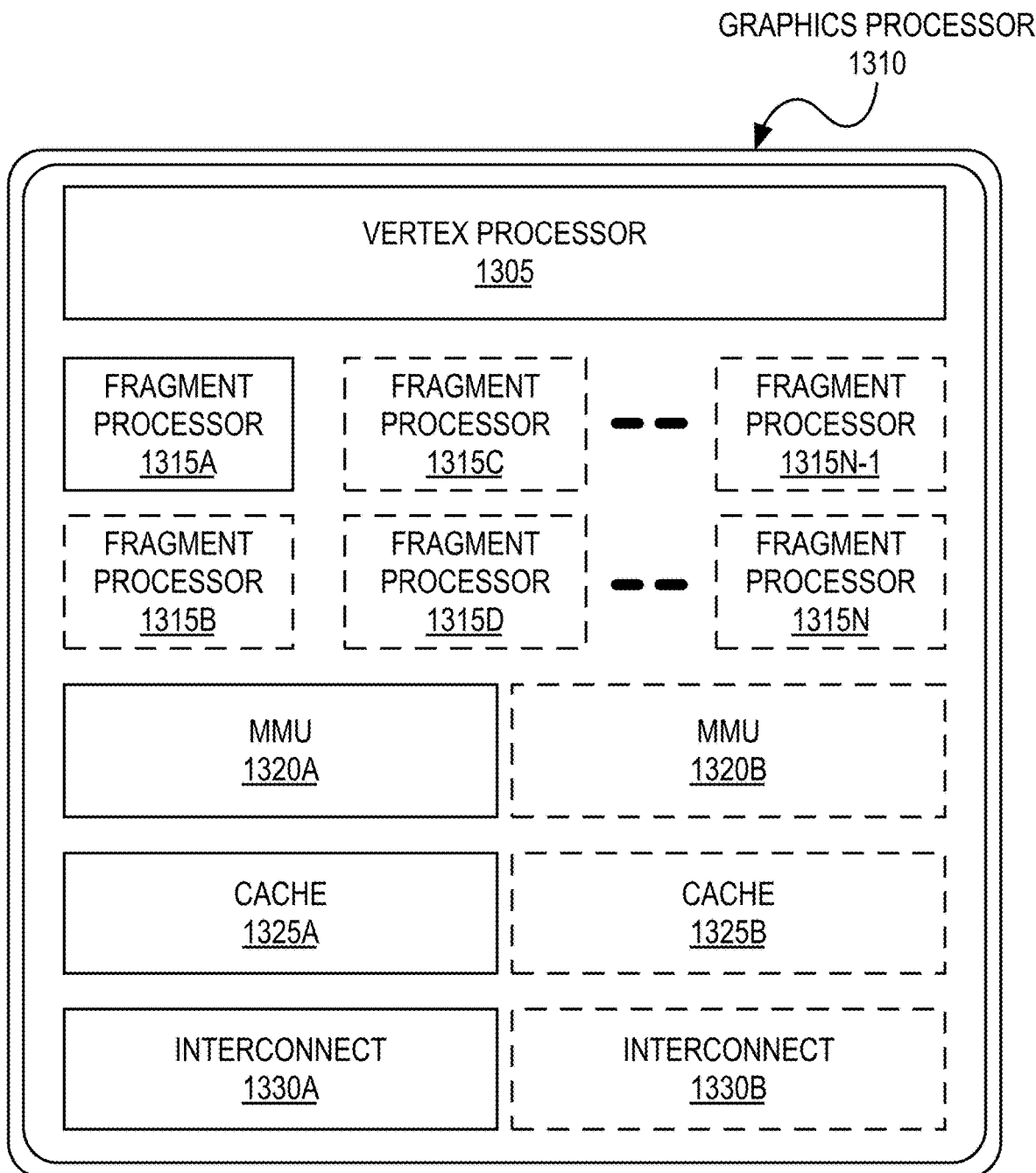
FIG. 13 illustrates an exemplary graphics processor of a system on a chip integrated circuit that may be fabricated using one or more IP cores.
Figure 14:
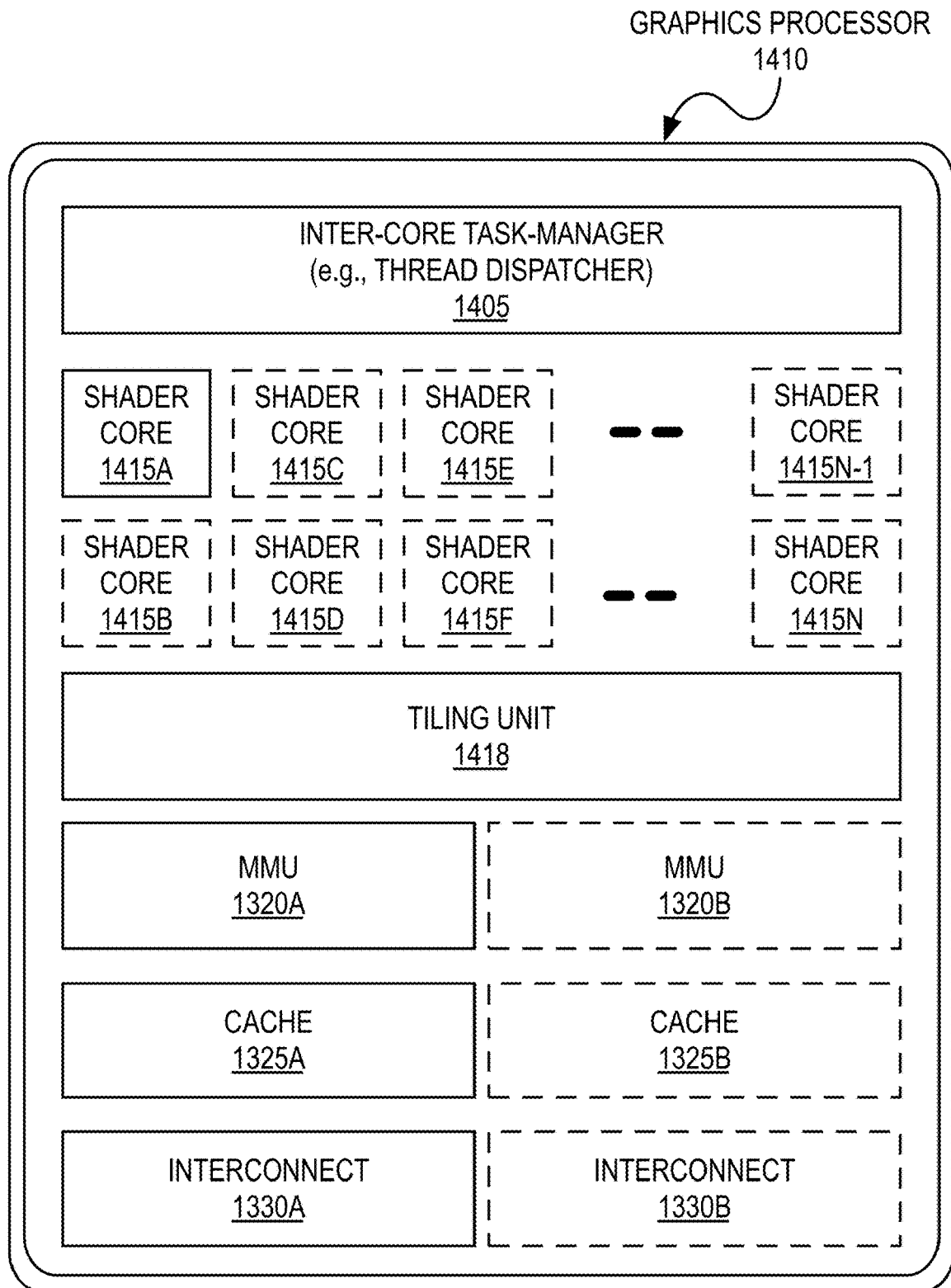
FIG. 14 illustrates an additional exemplary graphics processor of a system on a chip integrated circuit that may be fabricated using one or more IP cores

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 131D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Augmented Reality/Virtual Reality Apparatus and Method

A. Overview

Figure 15A:
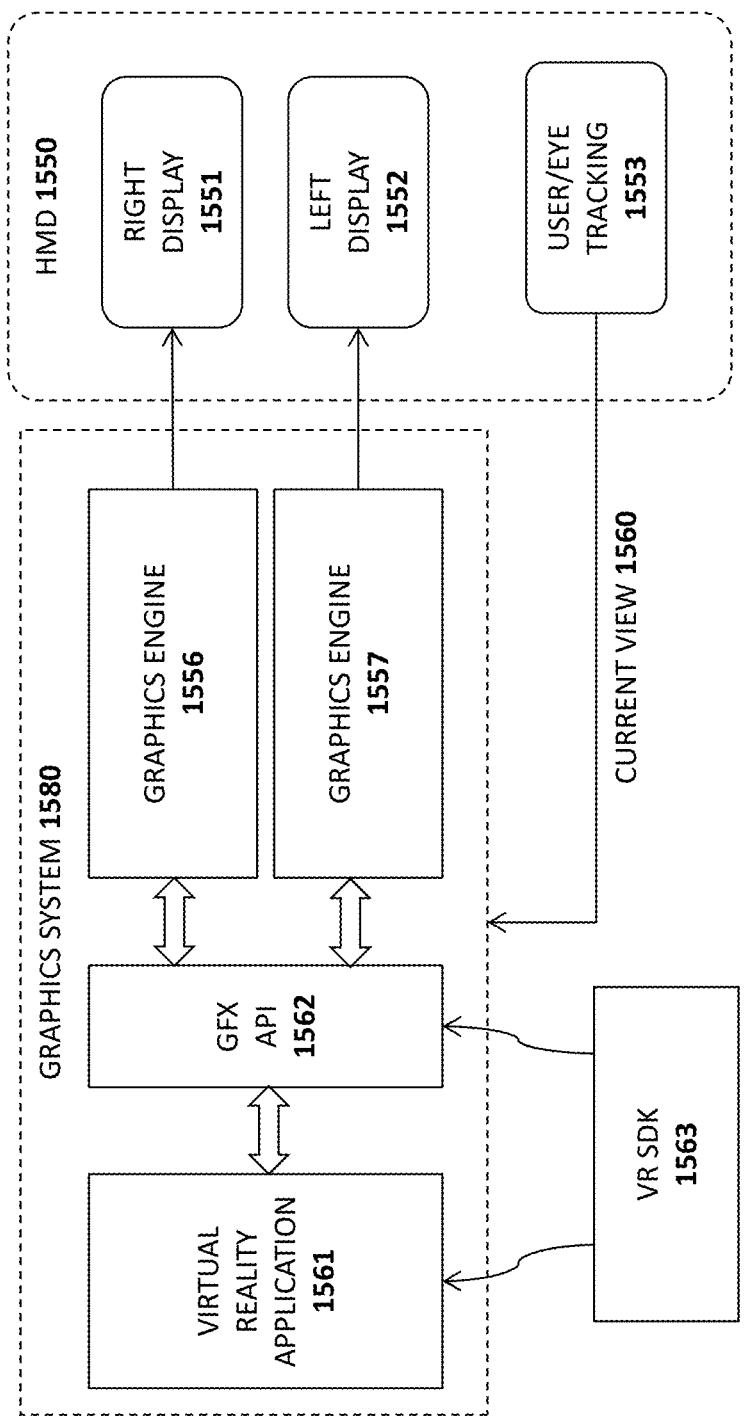
FIGS. 15A-C illustrate different embodiments of the invention having multiple graphics engines/pipelines.

Embodiments of the invention may be implemented within a virtual reality system such as that illustrated in FIG. 15A which includes a graphics system component 1580 and a head-mounted display (HMD) 1550. In one embodiment, the HMD 1550 comprises a right display 1551 on which images frames are rendered for viewing by the user's right eye and a left display 1552 on which image frames are rendered for viewing by the user's left eye. Separate graphics engines, 1556 and 1557, include graphics processing pipelines for rendering the right and left image frames, respectively, in response to the execution of a particular virtual reality application 1561. Each of the graphics engines 1556-1557 may comprise a separate graphics processing unit (GPU). Alternatively, the graphics engines 1556-1557 may include different sets of graphics execution resources within a single GPU or spread across multiple GPUs. For example, in a virtualized environment, a separate virtual GPU (vGPU) may be allocated to each display 1551-1552. Regardless of how the GPU resources are partitioned, the graphics engines 1556-1557 may implement any of the graphics processing techniques described herein.

In one embodiment, a user/eye tracking device 1553 integrated on the HMD 1550 includes sensors to detect the current orientation of the user's head and the direction of the user's gaze. For example, the orientation of the user's head may be captured using optical sensors and accelerometers while the current direction of the user's gaze may be captured with optical eye tracking devices such as cameras. As illustrated, the user/eye tracking device 1553 provide the user's current view 1560 to the graphics system 1580, which then adjust graphics processing accordingly (i.e., to ensure that the current image frames being rendered are from the current perspective of the user).

In one embodiment, the virtual reality application 1561 utilizes a graphics application programming interface (API) 1562 to implement features of the graphics engines 1556-1557 as described herein. For example, the graphics API 1562 may be provided with a virtual reality software development kit (SDK) 1563 which a developer may use to generate application program code for the virtual reality application 1561. For example, the virtual reality SDK 1563 may include a compiler (and/or other design tools) to generate object code for the virtual reality application 1561 which uses the API 1562 (e.g., by making calls to functions/commands included in the API). One or more of the techniques described herein may be implemented using the graphics API 1562, hardware within the graphics engines 1556-1557, and/or a combination thereof.

Figure 15B:
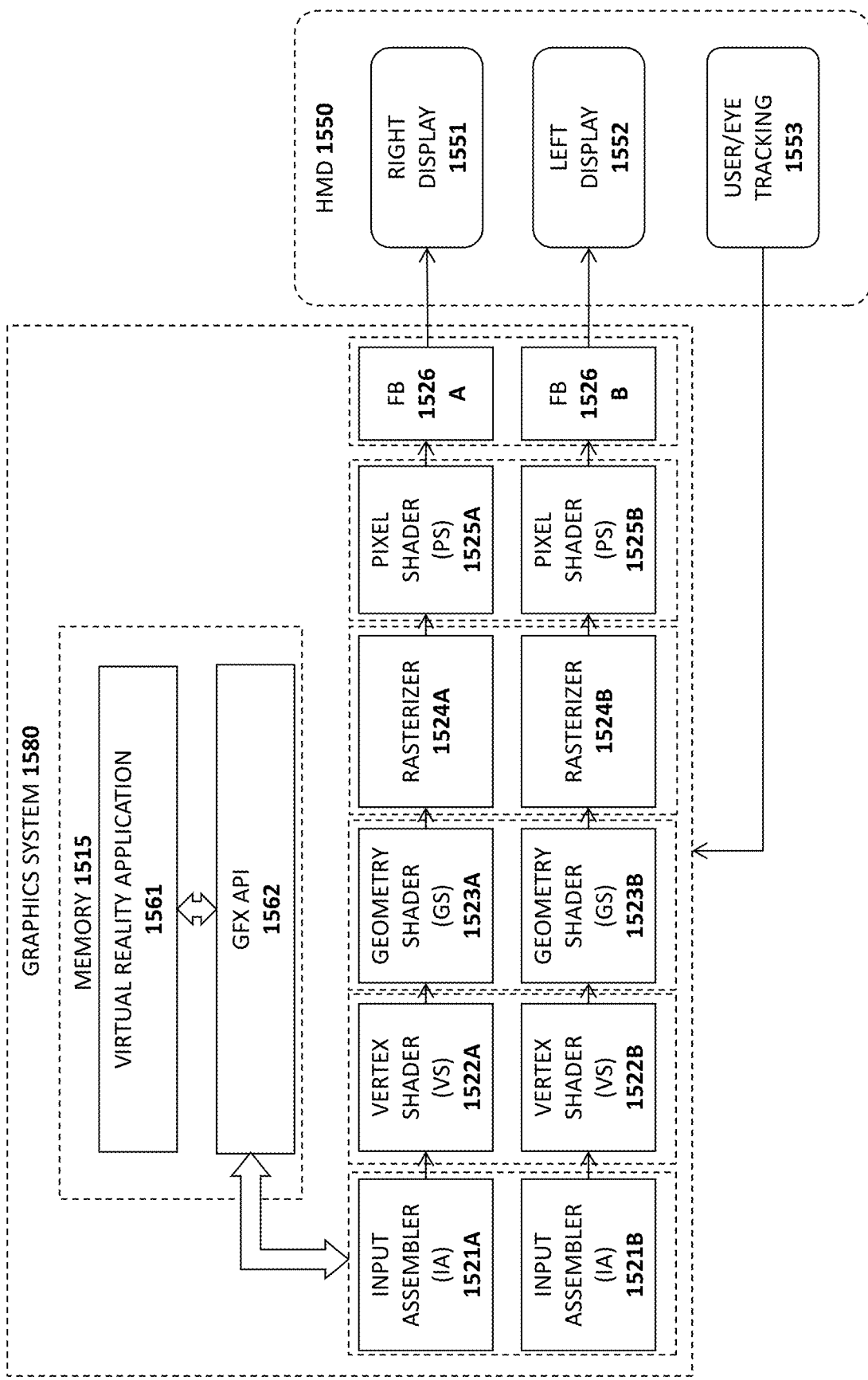

FIG. 15B illustrates the various stages of the two graphics pipelines for the right and left displays 1551-1552 in accordance with one embodiment. In particular, rasterization-based pipelines are illustrated including an input assembler (IA) 1521A-B which reads index and vertex data and a vertex shader (VS) 1522A-B from memory 1515. As mentioned, commands may be received by the IA 1521A-B via the graphics API 1562. The vertex shader 1522A-B performs shading operations on each vertex (e.g., transforming each vertex's 3D position in virtual space to the 2D coordinate at which it appears on the screen) and generates results in the form of primitives (e.g., triangles). A geometry shader (GS) 1523A-B takes a whole primitive as input, possibly with adjacency information. For example, when operating on triangles, the three vertices are the geometry shader's input. The geometry shader 1523A-B can then emit zero or more primitives, which are rasterized at a rasterization stage 1524A-B and the resulting fragments ultimately passed to a pixel shader (PS) 1525A-B, which performs shading operations on each of the individual pixels which are stored, frame by frame, within a frame buffer 1526A-B prior to being displayed on the HMD.

Figure 15C:
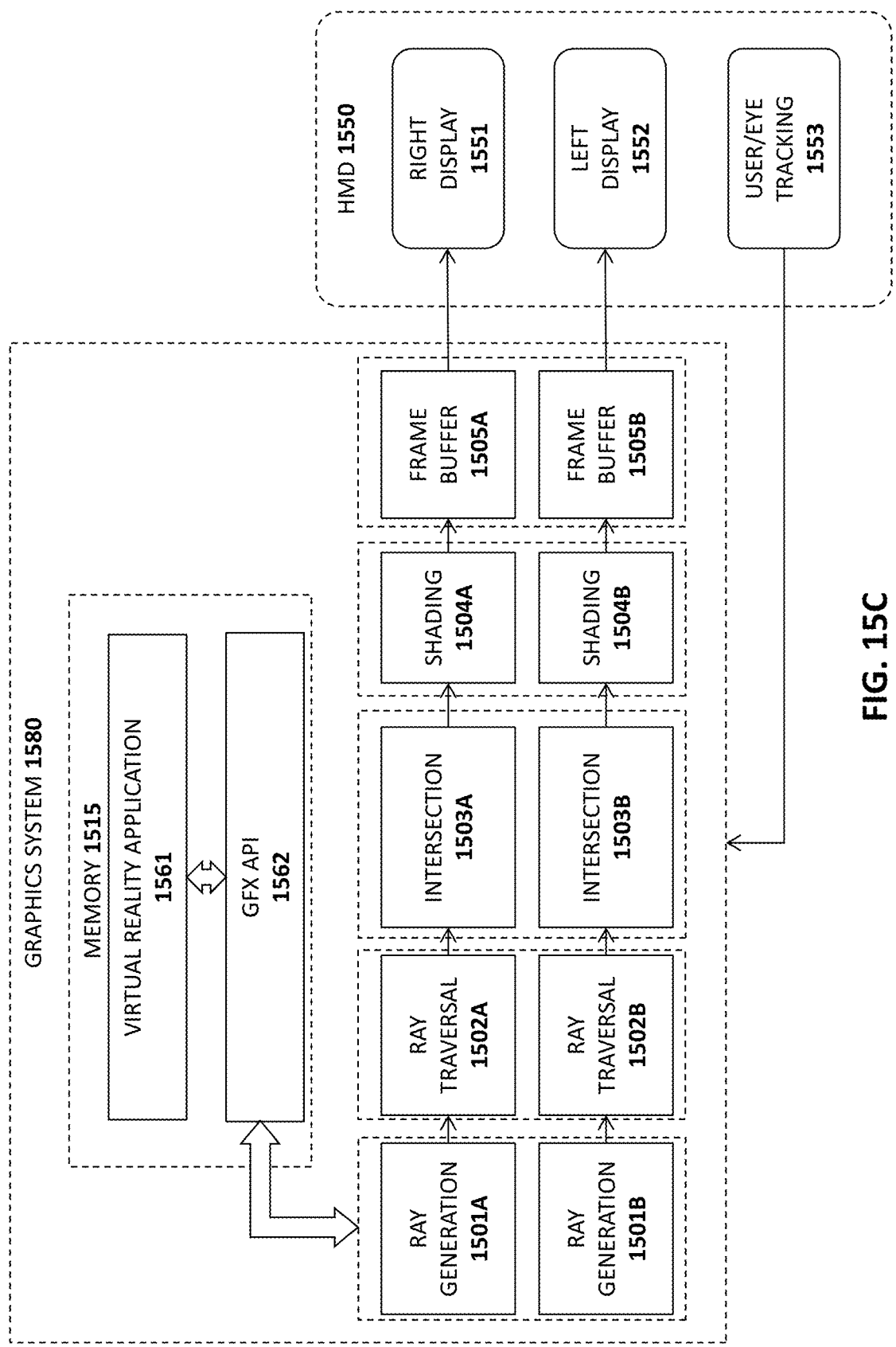

In one embodiment, a global illumination graphics processing architecture such as a ray tracing architecture may be employed. FIG. 15C, for example, illustrates an exemplary ray tracing-based graphics pipeline 1500 in which one or more pipeline stages 1501A-B to 1505A-B perform ray-tracing based rendering for the left and right displays 1551-1552. The illustrated stages include a ray generation module 1501A-B which generates rays for processing. For example, one embodiment performs breadth-first ray tracing per image tile, where a tile denotes a small fixed-size rectangular region. In one embodiment of a breadth-first implementation, one ray per pixel is generated for each iteration on the image tile. A ray traversal module 1502A-B traverses each ray against a bounding volume hierarchy (BVH) or other acceleration data structure. One or more intersection modules 1503A-B test the ray against one or more triangles or other primitives, and in the end, the traversal and intersection units must find the closest primitive that each ray intersects. One or more shader units 1504A-B then perform shading operations on the resulting pixels which are stored, frame by frame, within a frame buffer 1505A-B prior to being displayed on the HMD 1550.

B. Foveated Rendering

Figure 16:
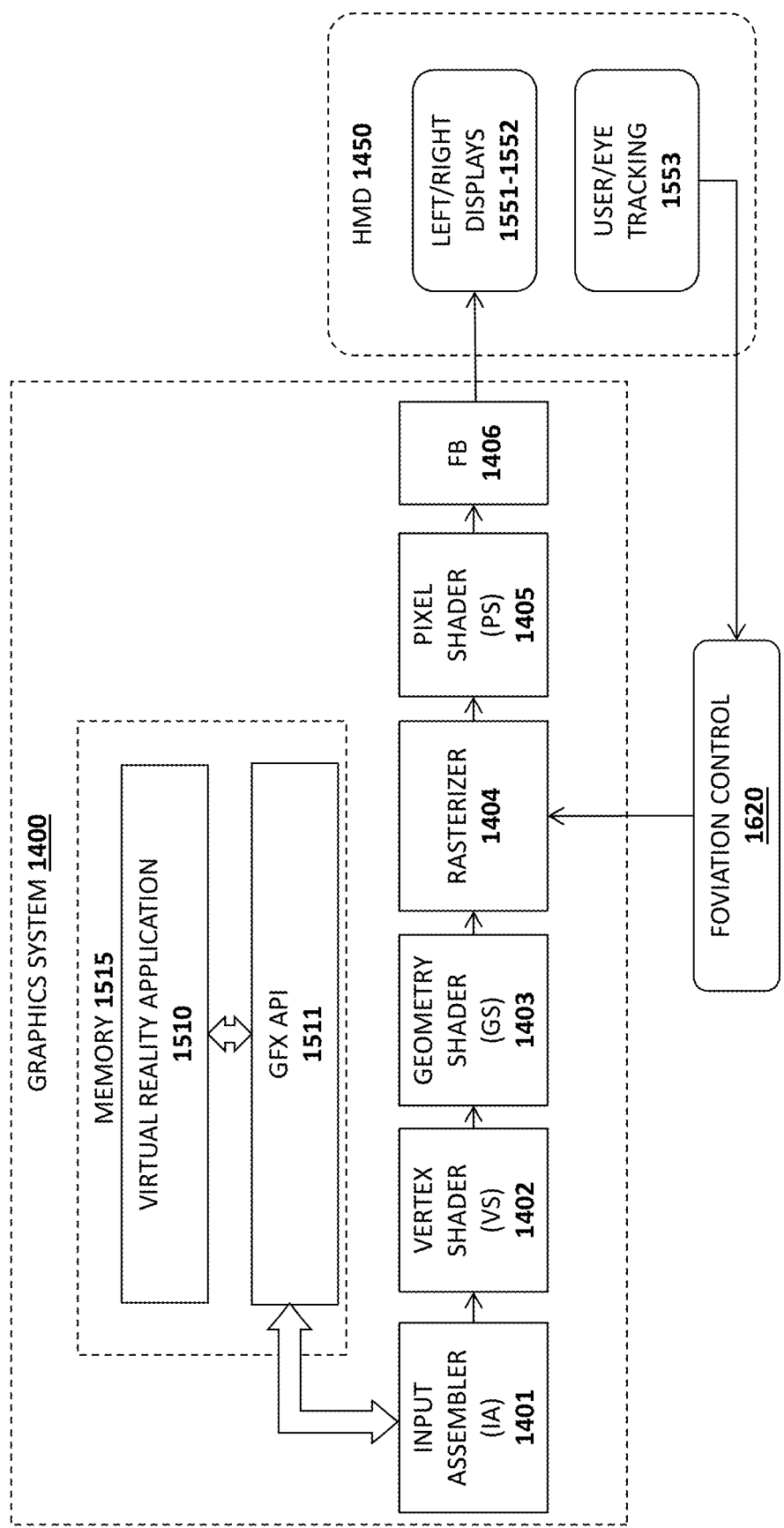
FIG. 16 illustrates one embodiment which performs foviation control over one or more pipeline stages.

One embodiment of the invention employs foveated rendering, a digital image processing technique in which the image resolution, or amount of detail, varies across the image in accordance with one or more "fixation points." A fixation point indicates the highest resolution region of the image and corresponds to the fovea, the center of the eye's retina. The location of a fixation point may be specified in different ways. For example, eye tracking devices which precisely measure the eye's position and movement are used to determine fixation points in virtual reality implementations. A higher resolution may be used in a region surrounding the fixation point than in other regions of the image. For example, as illustrated in FIG. 16, a foveation control module 1620 may control the rasterizer 1404 to use a higher sample or pixel density for the foveated area of the image.

C. Time Warping

Some embodiments of the invention may be employed in a VR system which uses time warping. Time warping is a technique used to improve performance in current virtual reality (VR) systems. According to this technique, each image frame is rendered in accordance with the current orientation of the user's head and/or eyes (i.e., as read from an eye tracking device and/or other sensors on the head mounted display (HMD) to detect the motion of the user's head). Just before displaying the next image frame, the sensor data is captured again and is used to transform the scene to fit the most recent sensor data (i.e., "warping" the current image frame). By taking advantage of the depth maps (i.e., Z Buffers) which have already been generated, time warping can move objects in 3D space with relatively low computational requirements.

One embodiment will be described with respect to FIG. 17 which illustrates a graphics processing engine 1300 communicatively coupled to a head-mounted display (HMD) 1350. A VR application 1310 is executed, generating graphics data and commands to be executed by the graphics processing engine 1300. The graphics processing engine 1300 may include one or more graphics processing units (GPUs) including a graphics pipeline to execute the graphics commands and render the image frames to be displayed on the HMD 1350 (e.g., such as the graphics pipelines described herein). For simplicity, only a single display 1717 is shown in FIG. 17, which may be the left and/or right display.

In operation, an image rendering module 1305 renders image frames to be displayed in the left and right displays 1717. In one embodiment, each image is rendered in accordance with a current orientation of the user's head and/or eyes, as provided by user/eye tracking module 1353 integrated on the HMD 1350. In particular, the HMD 1350 may include various sensors to track the current orientation of the user's head and cameras and associated circuitry/logic to track the current focus of the user's eyes. In a virtual reality implementation, this data is used to render left/right images from the correct perspective (i.e., based on the direction and focus of the user's current gaze).

Figure 17:
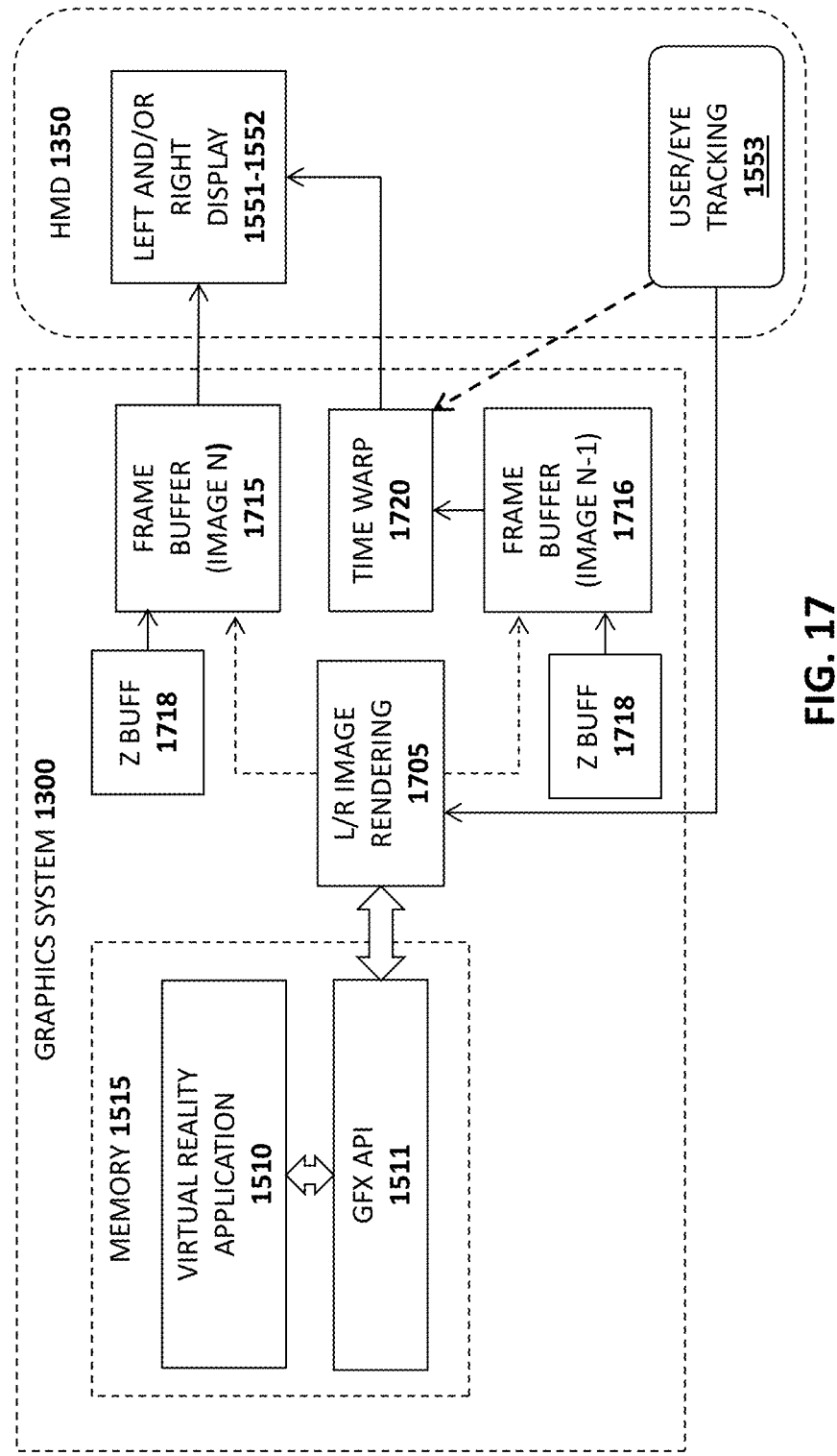
FIG. 17 illustrates time warping performed in accordance with one embodiment of the invention.

While illustrated as a single component in FIG. 17 for simplicity, separate image rendering circuitry and logic may be used for the left and right image frames. Moreover, various other graphics pipeline stages are not illustrated to avoid obscuring the underlying principles of the invention including, for example, a vertex shader, geometry shader, and texture mapper. A ray tracing architecture employed in one embodiment may include a ray generation module, a ray traversal module, an intersection module, and a shading module. In any implementation, the rendering module 1705 renders images for the left and right displays 1717 based on the current orientation/gaze of the user.

In the illustrated embodiment, a first frame buffer 1716 is storing an image frame N−1, currently displayed within the left/right display 1717 of the HMD. The next image frame to be displayed (image frame N) is then rendered within a second frame buffer 1715. In one embodiment, the image rendering module 1705 uses the coordinate data provided by the user/eye tracking module 1553 to render the next frame within frame buffer 1715. At the time the next frame needs to be displayed within the left and/or right display 1717, time warp module 1720 transforms image frame N−1 or image frame N (if rendering of image frame N is complete) to fit the most recent sensor data provided by user/eye tracking module 1553. This transformation is performed by the time warp module 1720 using the previously-generated depth maps stored in the processing engine's Z-buffers 1718. The transformation moves objects in 3D space with relatively small computational requirements, resulting in a more recently completed product without the need to re-render the scene. Thus, in most cases, it should be substantially similar to the image frame which would have been rendered if rendering had occurred more quickly.

Apparatus and Method for Rendering Stereoscopic, Spherical Panoramic Images

The embodiments of the invention described below provide numerous benefits over prior systems. First, "reverse ray casting" techniques are used in the vertex processing stage. Instead of casting ray to a certain direction and searching for an intersection with the scene (the common ray casting approach), one embodiment of the invention solves the reverse problem. That is, given the point in the scene that the ray passes, this embodiment determines what its initial direction would be and/or the latitude/longitude angles that will result in this direction. This allows the efficient identification of each vertex position in the final panoramic image.

In addition, one embodiment of the invention implements a solution to a complex evaluation by decomposing it into two simpler evaluations which dramatically improves the efficiency of the overall solution. Moreover, one embodiment uses a cubemap in order to enable graphics pipeline interpolations to occur on plane surfaces (as it was designed to happen) instead of the spherical surface of a panoramic image.

Finally, one embodiment generates normalized device coordinates (NDC) for each vertex in the scene. Instead of projecting vertices to a plane (which is the normal operation of the vertex processing stage) vertices are manipulated in such a way that permits them to reach correct positions after the cubemap is converted to a panoramic image of an equirectangular projection. The detailed description below demonstrates that this is the equivalent of projecting to a plane a ray that originates from an imaginary "center camera" rotated by the same longitude/latitude.

A full 360° panoramic image is an image that fully covers the area around the camera including a 360° horizontal field-of-view and a 180° vertical field-of-view. In order to use such an image, a special viewer is needed that uses it as a texture for the sphere surrounding the camera. Such an image is typically referred to as a "Spherical Panorama" or sometimes a "Panoramic Image in Equirectangular Format."

Figure 18A:
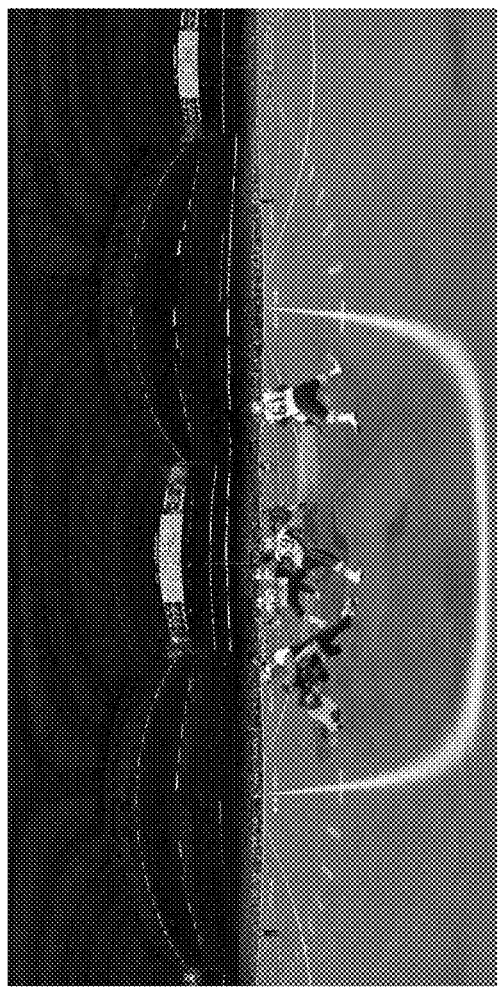
FIGS. 18A-B illustrate an example of spherical panorama and how it looks through a viewer, respectively.
Figure 18B:
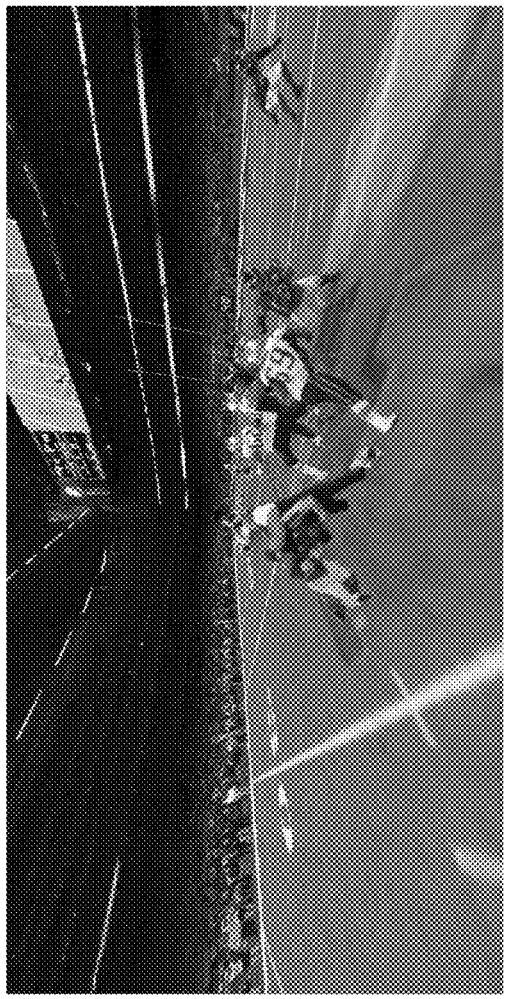

FIG. 18A shows an example of spherical panorama and FIG. 18B shows how it looks through a viewer (e.g., a HMD 1450 as described above). Notice that "30 yard line" appears curved in FIG. 18A, but becomes a perfectly straight line as it will wrap to the sphere in the viewer in FIG. 18B.

Figure 19:
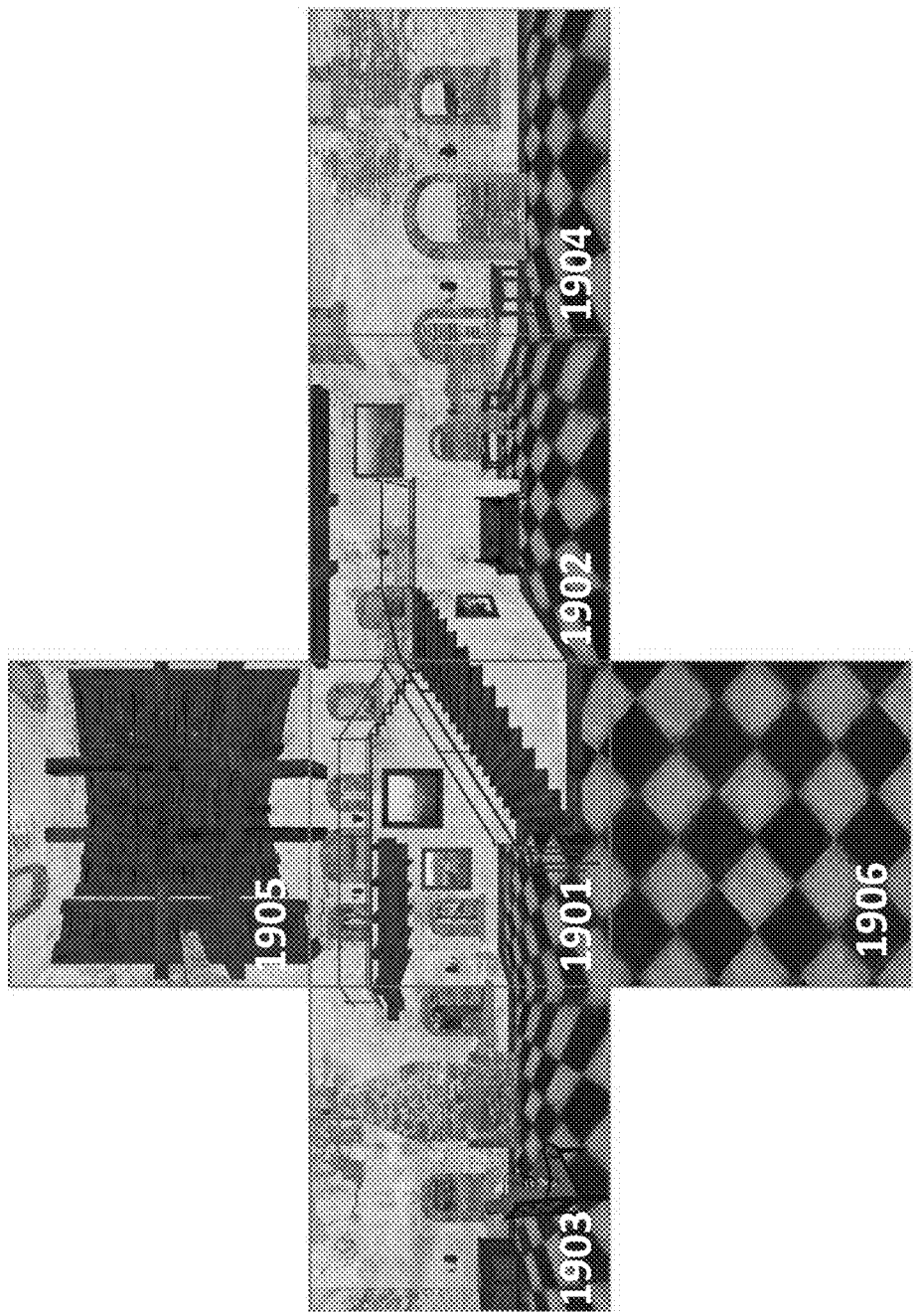
FIG. 19 illustrates an example cubemap.

To produce such an image, a "cubemap" is generated, such as illustrated in FIG. 19, that will cover the area around a chosen point of view. The camera frustum is set to a 90° field of view (both vertically and horizontally) and six snapshots are created for the six planes of the cube: front 1901, right 1902, left 1903, back 1904, top 1905 and bottom 1906. Note that this provides full coverage of the space surrounding the camera, while there is a full continuity between sides (i.e., no gaps or overlapping areas).

Figure 20:
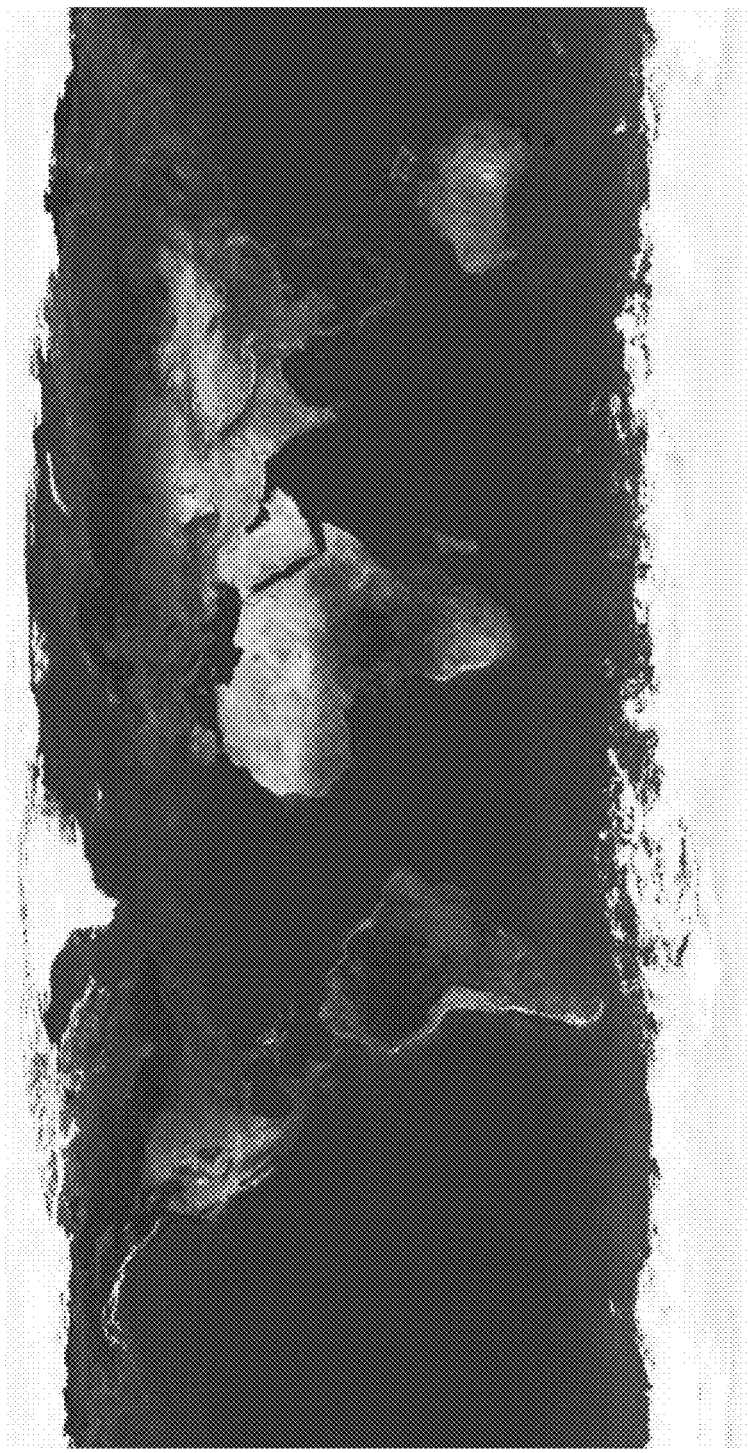
FIG. 20 illustrates an example equirectangular image.

The cubemap is then converted to an equirectangular map. One way of thinking about an equirectangular image is representing a spherical object as a flat 2D image. Probably the most famous equirectangular image is the "unprojected world map" shown in FIG. 20.

The projection maps meridians to vertical straight lines of constant spacing, and circles of latitude to horizontal straight lines of constant spacing. Each point in such a map has a latitude/longitude coordinates (linearly distributed along the map) that represents two angles, one from the equator and one from the prime meridian, that identify the desired point on the sphere surface. An example is illustrated in FIG. 21A which shows longitude measured from the prime meridian and latitude measured from the equator.

FIG. 21B shows how the spherical surface may be represented by a 2D image, using a globe and world map as 3D and 2D examples, respectively. Orange circles 2101a-2102a on the globe are stretched into ovals 2101b-2102b, particularly at the poles (e.g., 2101b is stretched to a greater degree than 2101a).

Figure 22:
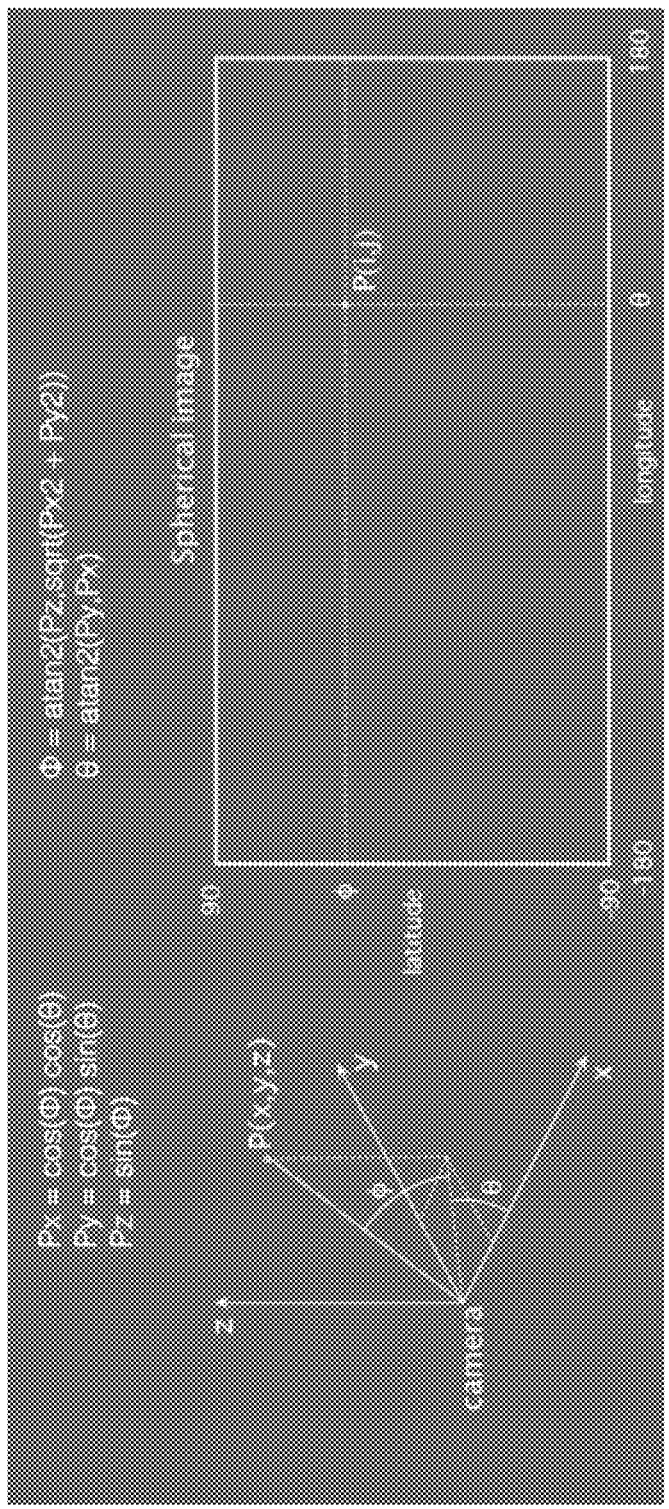
FIG. 22 illustrates example calculations for obtaining a ray from latitude/longitude.

Consequently, understanding that each pixel in the final map represents a position on a sphere surface, a ray in 3D space can be calculated corresponding to that pixel at that position. All that is required is to determine the intersection of this ray with the cube (discussed above) and take cubemap's color from the point of intersection. The math of obtaining a ray from latitude/longitude is illustrated in FIG. 22. In particular, using the illustrated x, y, and z coordinates, $Px=\cos(\phi)\cos(\theta)$, $Py=\cos(\phi)\sin(\theta)$, and $Pz=\sin(\phi)$. where $\phi=\mathrm{atan2}(Pz, \mathrm{sqrt}(Px2+Py2))$ and $\theta=\mathrm{atan2}(Py, Px)$. Certain APIs such as OpenGL provide a mechanism for sampling cubemap textures given a ray in Cartesian coordinates.

Figure 23:
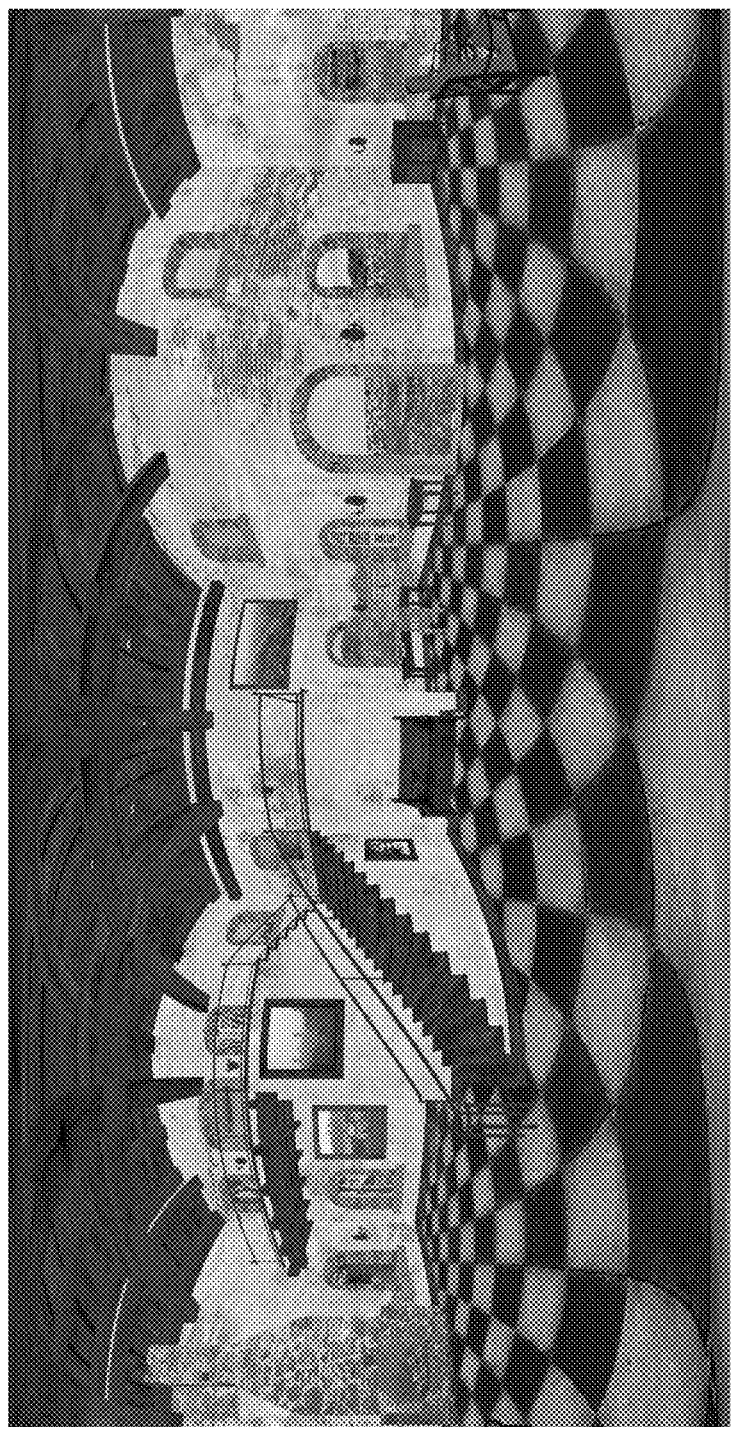
FIG. 23 illustrates an example of a panorama obtained from a cubemap.
Figure 24:
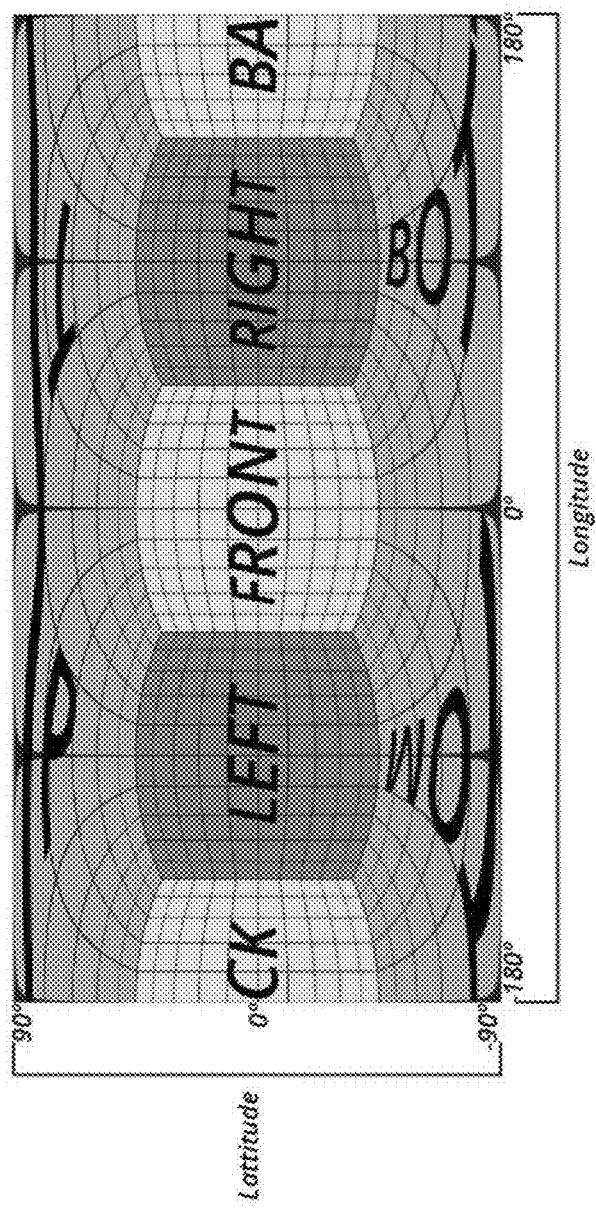
FIG. 24 illustrates how the cubemap may be unwrapped.

FIG. 23 illustrates an example of the obtained panorama from the cubemap illustrated in FIG. 19 and FIG. 24 illustrates how a cubemap may be "unwrapped" to a spherical panorama.

In summary, the rendering engine of one embodiment produces a spherical panorama as follows. First, the camera is positioned at a desired location with its field of view set to 90° and its aspect ratio to '1.' Six images are generated corresponding to six sides: front, left, right, back, top, bottom, which are loaded as cubemap textures. A pixel shader is created that for each pixel calculates Cartesian coordinates on a sphere surface based on pixel location (assuming a latitude/longitude coordinate system). Finally, the obtained location is used as a ray for cubemap sampling to obtain pixel color.

Stereoscopic Rendering

Stereoscopy is defined as technique for creating or enhancing the illusion of depth in an image by means of presenting two offset images separately to the left and right eye of the viewer. These two dimensional images are then combined in the brain to provide the perception of 3D depth. A special viewer/device is needed to produce each one of the images to its corresponding eye (e.g., such as the HMDs 1350, 1450 discussed above).

The idea behind stereoscopic rendering is to render the scene from two positions slightly shifted to simulate "looking with two eyes." As mentioned, when rendering in game engines, a scene described by a series of coordinates in 3D space is captured and each coordinate with a perspective projection along the eye direction on a near plane 2501 in in the viewport, as illustrated in FIG. 25A.

FIG. 25B illustrates an example setup for stereo rendering. The virtual screen 2502 is where right and left frustums converge and objects appear flat (not to be confused with the viewport on which the image is projected). This plane 2502 can also be referred to as "zero parallax" or "focal length distance." Objects appear flat because each point (vertex) located at this plane appears at the same position in viewport for both left and right eye.

In cases where the object is behind the virtual screen, the projection for the left eye is on the left and the projection for the right eye is on the right. The distance between the left and right eye projections is called the horizontal parallax. Since projections are on the same side as the respective eyes, it is called a positive parallax. Such an object will appear as being inside of the screen. Note that the maximum positive parallax occurs when the object is at infinity and, at that point, the horizontal parallax is equal to the interocular distance (or distance between the eyes).

FIG. 26A illustrates an example of positive parallax in which the point 2601 being projected is behind the projection plane 2600. FIG. 26B illustrates an example of negative parallax in which the point 2602 being projected is in front of the projection plane 2600. If an object is located in front of the projection plane 2600 then the projection for the left eye is on the right and the projection for the right eye is on the left, as illustrated. This is known as negative horizontal parallax. Note that a negative horizontal parallax equal to the interocular distance occurs when the object is half way between the projection plane and the center of the eyes. As the object moves closer to the viewer the negative horizontal parallax increases to infinity causing very unpleasant visual effect. Objects having negative parallax will appear as "bursting out of the screen." While negative parallax has a "wow-effect", positive parallax is much easier to look at for extended periods of time.

FIG. 26C illustrates an example of zero parallax in which the point being projected 2603 is in the projection plane 2600. If an object lies at the projection plane then its projection onto the focal plane is coincident for both the left and right eye, hence zero parallax.

Figure 27A:
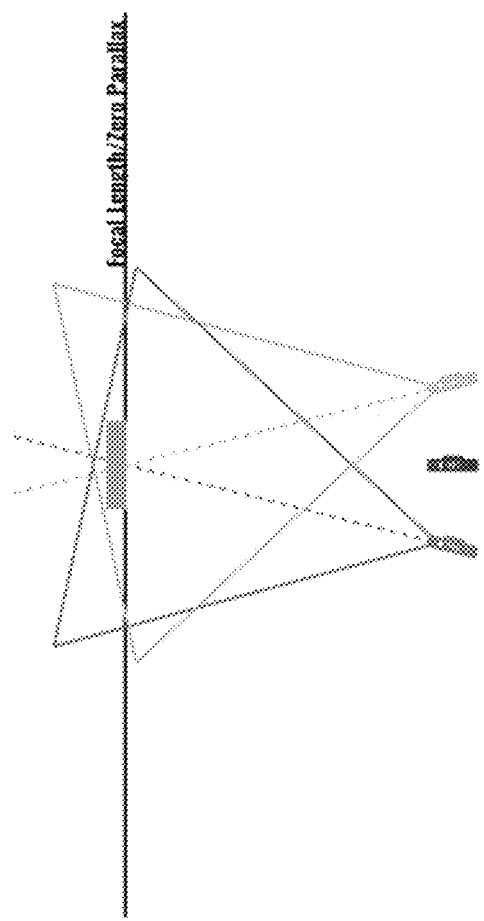
FIGS. 27A-C illustrate example camera positions.
Figure 27B:
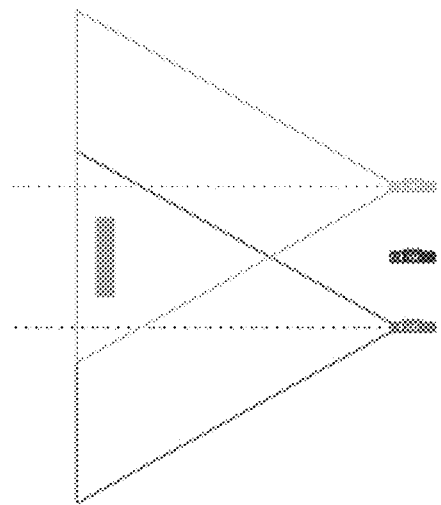
Figure 27C:
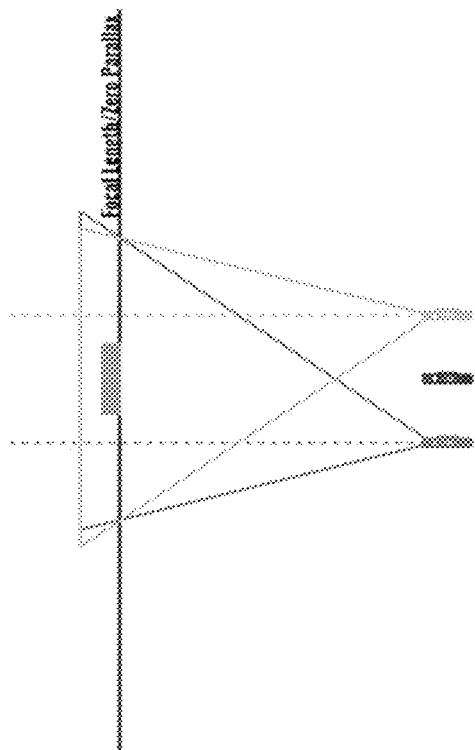

Note that in order to achieve frustum convergence as in FIG. 26B asymmetric frustums must be used. Cameras are positioned slightly rotated towards each other, or "toed-in" as this seems intuitively correct since it behaves the way our eyes do. FIG. 27A illustrates an example. However this produces an effect called "vertical parallax" due to the perspective offset that gets more noticeable towards the edges of the frame. This method cause eye-strain due to a stereoscopic distortion The cameras may be positioned in a parallel setup, as shown in FIG. 27B, to solve the problem of vertical parallax, but it immediately introduces the problem of Zero Parallax being stuck at infinity. This means everything in the scene will appear to pop out of the screen. This can be fixed in post processing using a technique called "Horizontal Image Translation", but it is a time-consuming process. The configuration in FIG. 27C is called "Off-Axis" and it is the most commonly used stereo setup. It does not produce vertical parallax and enables control of the Zero-Parallax plane by using asymmetrical frustums.

As can be understood from the above, the degree of the stereo effect depends on both the distance of the camera to a virtual plane and the separation of the left and right cameras (interocular distance). Too large a separation can be hard to resolve and is known as hyper-stereo. A good ballpark separation of the cameras is 1/30 of the distance to the virtual screen, while the maximum separation for comfortable viewing is considered to be 1/20 of the distance. Another constraint in general practice is to ensure the negative parallax does not exceed the eye separation (which occurs at half distance to the virtual screen, as noted above).

To produce stereoscopic panoramic images, the above techniques are employed twice, for the left and the right eye with a vertical shift between them. Such a setup is illustrated in FIGS. 28A and 28B. The problem is that there will be a stereo 3D effect when cameras are looking up (FIG. 28A) but when they turn right (FIG. 28B) the horizontal disparity is gone and vertical disparity is introduced. Moreover, when cameras are turned in the opposite direction from FIG. 28A (looking down) a cross-eyed effect would be introduced due to camera's viewpoints being swapped (left swapped with right).

As illustrated in FIG. 28C, to avoid this headache-inducing effect, a camera rig 2801 is utilized in one embodiment that behaves the same way users' eyes do in relation to their heads. This means the two cameras of the rig 2801 need rotate around a single shared pivot point 2802 with the preferred eye separation as the distance between the cameras. From observing this arrangement, it becomes clear that producing panoramic images as described with respect to FIGS. 19-24 is untenable because, for each pixel in the final image, the cameras have to be positioned in different locations.

Figure 29B:
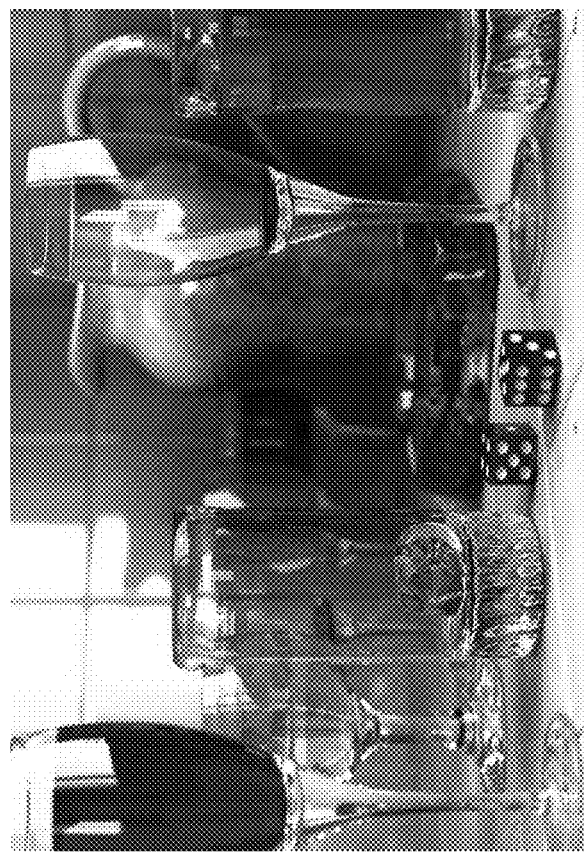
FIGS. 29A-B illustrate example ray tracing features.
Figure 29A:
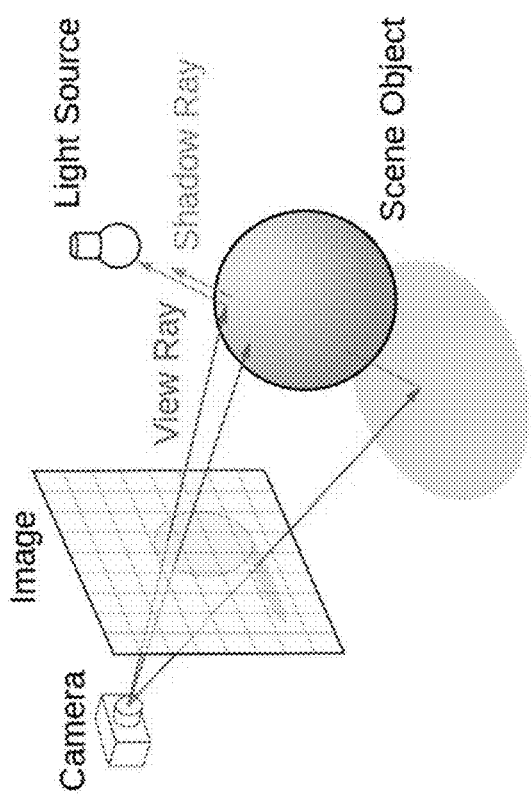

One technique employed in one embodiment takes a significant number of images in all possible directions from correct positions and then uses stitching software to combine them in a panoramic image. This technique is applied to both left and right eye images. Recently (in Siggraph 2016) an API was introduced for such workflows, leveraging the process by hardware acceleration. However, it may be overly burdensome to stitch images for each panorama based on matching features in overlapping areas. Moreover, stitching software products do not always operate seamlessly, but rather have stitching artifacts.

in a field of producing panoramic stereoscopy from synthetic 3D scenery Domemaster3D plugin for Autodesk Maya may be used. It is open source and is capable of producing stereoscopic panoramic images from Maya scenes. It takes advantage of the fact that Maya is a raytracing rendering engine, i.e. the color of each pixel in the image is obtained from a ray that is casted from camera position (to a direction corresponding to this pixel) and is calculated based on the intersections with objects it encounters. This is useful when there is a need to produce very realistic synthetic images, as the rays may "bounce" between objects to generate the scene. This enables the simulation of realistic reflections in the final result. FIG. 29A illustrates an example ray tracing setup and FIG. 29B illustrates an example of a synthetic image obtained from the ray tracing engine. Needless to say that this rendering technique differs a lot from what game engines do, which as mentioned above, project coordinates to the viewing plane.

In order to produce a stereoscopic panorama with a ray tracing engine, the setup from FIG. 28c is considered. The "ray" from each camera is well defined by the initial setup position. Recall that panoramic images can be imagined as a latitude/longitude map. Then, for each pixel the initial setup may be rotated with corresponding latitude/longitude angles, and requesting the color obtained for the resulting ray.

Paul Bourke's method

Figure 30A:
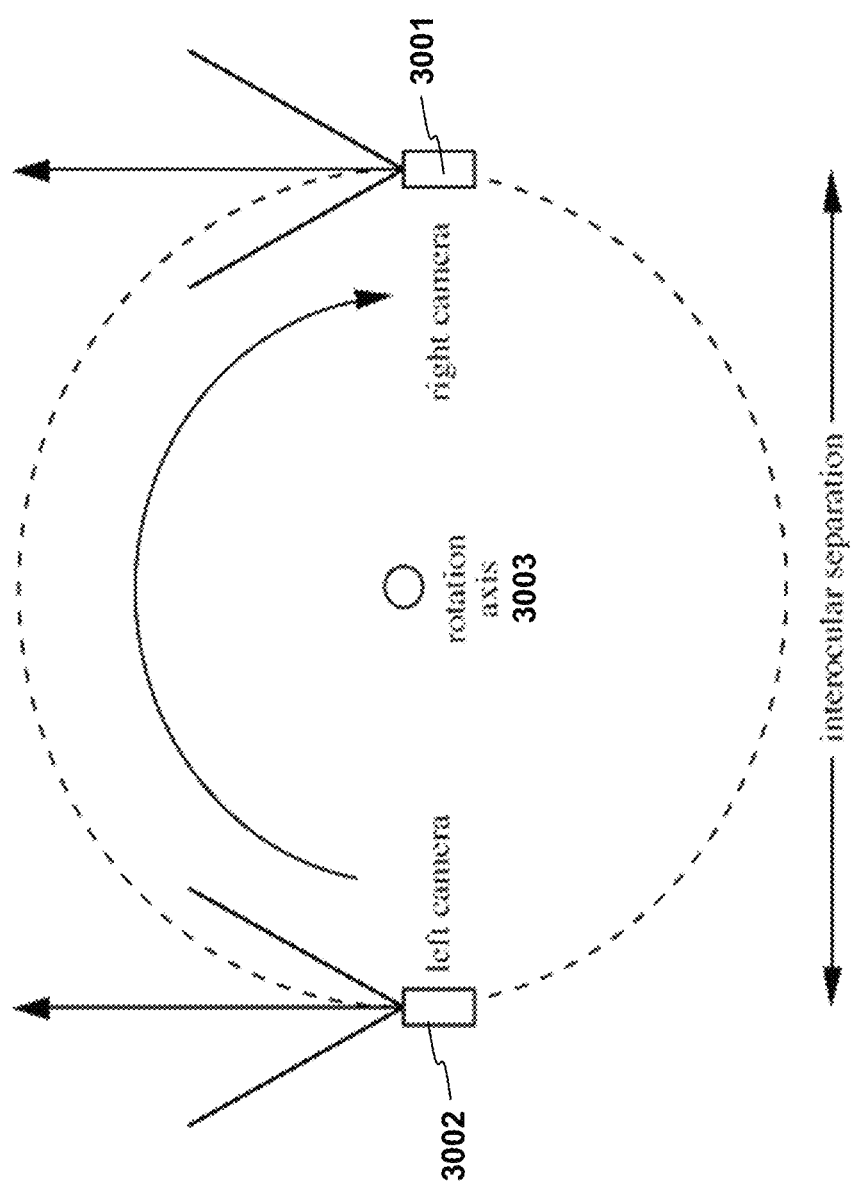
FIG. 30A illustrates examples of synthetic rendering.

In 2002 Paul Bourke proposed a method of producing stereoscopic panoramas for photography and later in 2006 in his article: "Synthetic Stereoscopic Panoramic Images" he extended the talk about synthetic rendering. Consider the setup as in FIG. 30A. Right and left cameras, 3001 and 3002, respectively, rotate around the axis 3003 on imaginary circuit with radius equal to half interocular distance. The final image is obtained from combining slim strips which are simple snapshots of narrow fields of view, taken from corresponding positions. FIG. 30B illustrates the setup for obtaining panoramic image 3005 for left camera. Note that the narrow aperture of each snapshot matches the rotation angle step size which results in continuous panoramic image 3005 without gaps or overlapping images. Although it seems that frustums of adjacent strips coincide perfectly, creating continuity, each snapshot is taken from a different position. Those objects placed in a transition area between one strip and another will appear from slightly different distances in both strips.

However, when the strips get smaller this difference becomes negligible. Experiments with parameters show that producing panoramic images from 360 strips of 1 degree snapshots results in a perfectly continuous image. In any case, in order to obtain a perfect wrap around the 0/360 boundary, the variables w and W/w in FIG. 30B must be integers. Moreover, in order for the antialiasing on strip edges to perform perfectly wider strips must be taken, and the middle portion is then extracted. Once again, the strip width and its edges that would be trimmed must have integer pixel sizes.

In one embodiment, the same snapshotting is also performed for the right-eye image. Controlling zero parallax distance may be done by adjusting the starting position of both cameras before the snapshotting or by shifting final panoramas. The required amount of shift D in order to obtain zero parallax at $f_0$ is given by:

$$D=W\phi/(2\pi)=W\,a\,\sin(r/f_o)/\pi$$

Figure 30C:
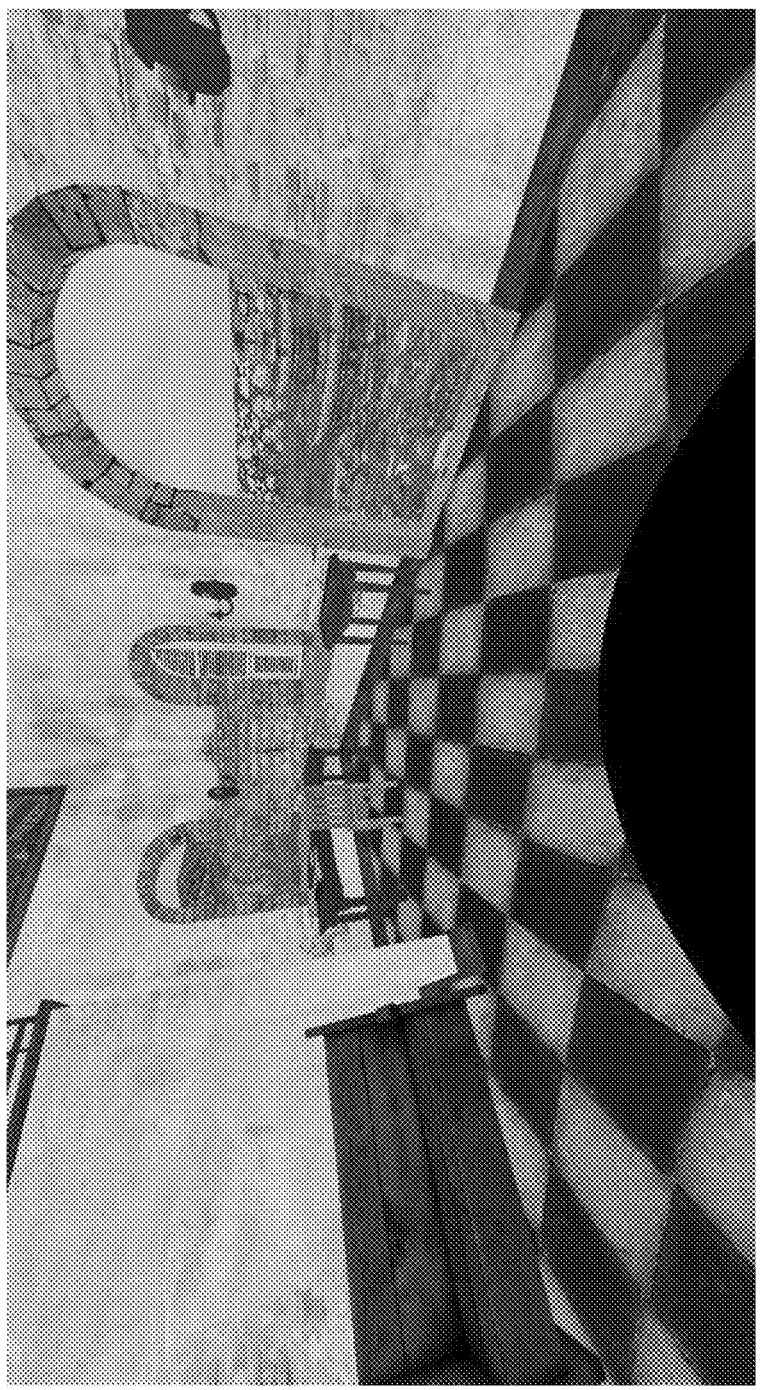
FIG. 30C illustrates results of a panoramic image.
Figure 32:
FIG. 32 illustrates a resulting panoramic image.

FIG. 30C shows result of creating such panoramic image and introducing it in a viewer.

In one embodiment illustrated in FIG. 31, the cameras 3101-3102 positioned in "toed-in" setup such as described above. However, unlike the implementation described above, very narrow frustums are used in FIG. 31. Consequently, vertical disparity is not presented and toed-in setup operates accurately. However, the embodiment in FIG. 31 does not provide full panoramic coverage with the top and bottom areas of the produced image remaining "blank". That is the reason for a "black hole" on the floor in FIG. 30C which significantly degrades the user experience.

Another thing to mention is that the obtained panorama is a cylindrical panorama (due to the nature of how it was created). When this is viewed in a viewer intended for spherical panoramas, distortions result near the edges. The more the vertical field of view gets, the more noticeable the distortions are. A special shader has to be used in order to fix this distortions.

To summarize, the main benefit of this implementation is its simplicity for implementation. Its drawbacks include the lack of full coverage and relatively heavy computation due to a large number of strips (720 rendering calls), their subsequent copies for combining them in one image and superfluous rendering areas for correct antialiasing.

Extensions to Bourke's Implementation

The fact that the techniques described above do not provide full coverage is significant. Recall that these techniques generate cylindrical coverage for the surroundings. FIG. 33A, for example, shows a camera taking snapshots with a frustum of a large vertical field of view angle (90 degrees in this case) and narrow horizontal. This produces narrow strips that will be further composited to a single panoramic image.

Figure 33B:
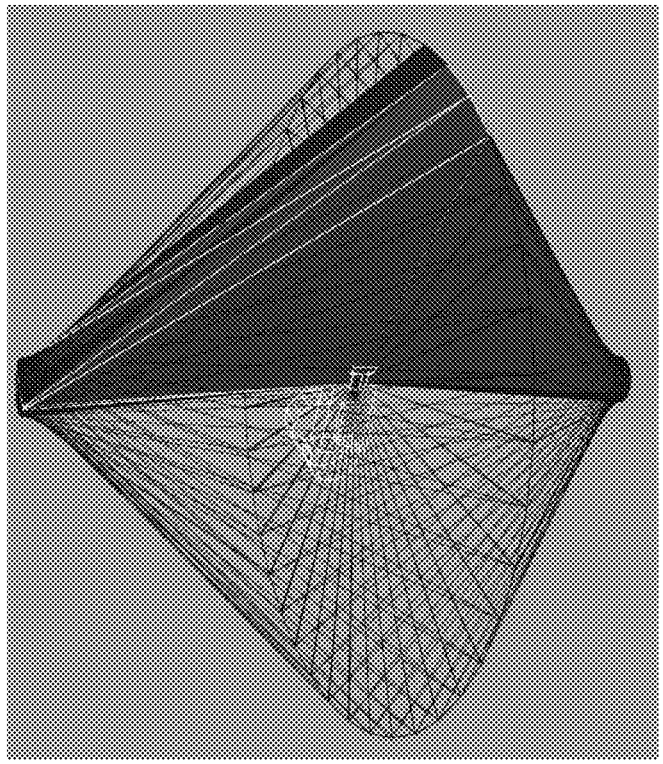
FIG. 33A-B illustrates coverage with adjustments to frustum position.
Figure 33A:
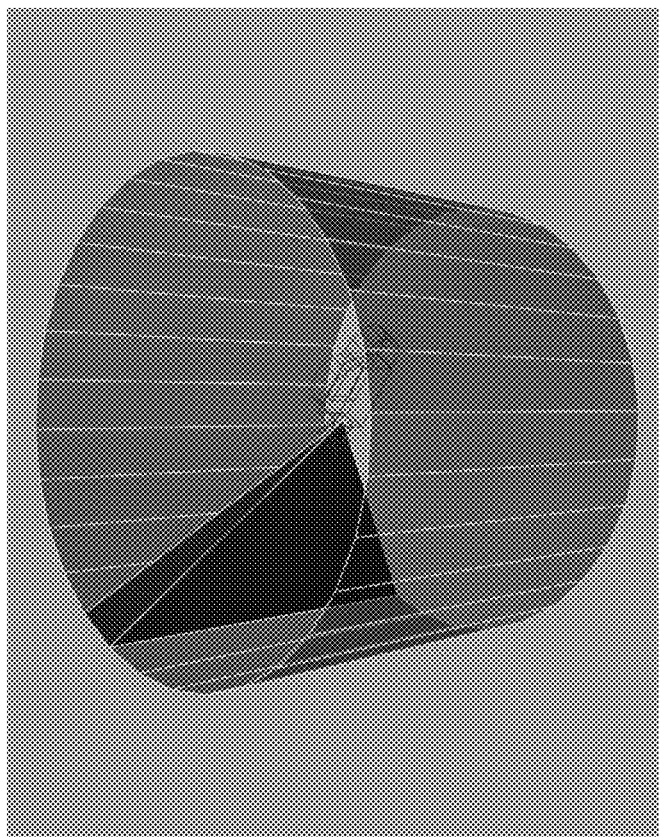

FIG. 33B illustrates one implementation which addresses at least some of these problems. There is no geometric setup that can achieve full coverage of surroundings with full continuity and without overlapping areas. It cannot be done by manipulating regular camera frustums that produce rectangular images. FIG. 33B illustrates an implementation in which the frustum position is rotated 45 degrees up to cover the upper half of the surroundings and 45 degrees down to cover the lower half. Since its vertical field of view is 90°, full coverage is achieved both in the vertical and horizontal dimensions. However, it can be seen that there are overlapping areas between the strips.

Figure 34:
FIG. 34 illustrates jaggy artifacts in an image.

FIG. 34 illustrates "jaggy artifacts" in the image that was produced with setup in FIG. 33B. Towards the poles, the artifact becomes more noticeable due to larger overlapping between the strips. However, it turns out (as suggested in Reference [14]) that artifacts disappear when the width of each strip is no more than one pixel. Each strip still has to be rendered with overlapping areas that will be trimmed as previously described for correct antialiasing. The resulting image now seems perfectly continuous, but it is still not perfect. It has distortions due to the fact that image was produced by the setup of a cone-like profile, and it is being viewed on spherical viewer.

In one embodiment of the invention, this problem is fixed by locating, for each pixel, where an imaginary ray intersects the cone surface (based on pixel position), extending it for intersection with the sphere and using 'y' coordinates from the sphere intersection.

Figure 35A:
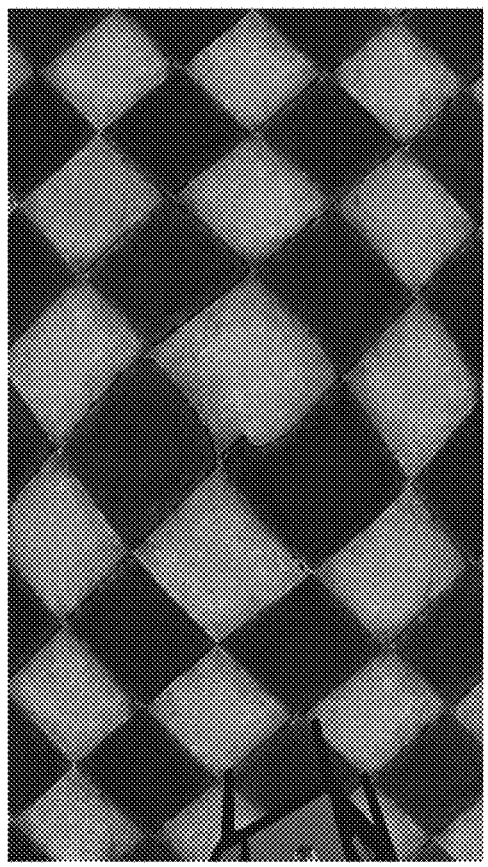
FIGS. 35A-B illustrate examples of swirling artifacts.
Figure 35B:
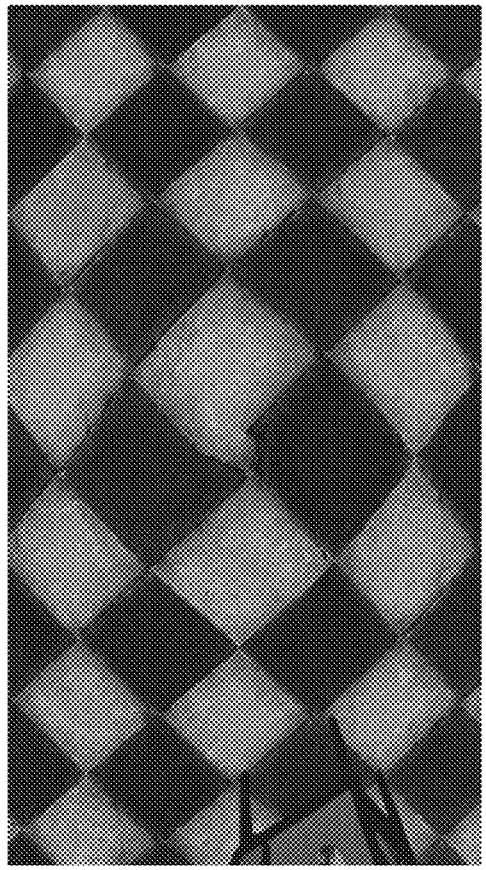

In order to exploit the resolution of modern stereo-capable devices (smartphones with daydream/GearVR or others) the resolution of the panoramic image for one eye should be near 6000×3000 pixels (assuming 90 degrees vertical field of view). For the above implementation this means that 24,000 rendering calls (6000 strips for the top and 6000 strips for the bottom for each eye) and subsequent trimming and composition, making it unusable for real-time applications. Moreover, the final result is not perfect. Very unpleasant artifacts of swirling can be seen at the bottom. The effect is even more prominent in stereo, both by its strength and the area it effects due to the fact that the direction of the swirl is opposite for left and right images. FIG. 35A, for example, shows a left image swirl and FIG. 35B shows a right image swirl.

The artifact results from the very definition of stereoscopic panoramic images. When looking towards the horizon (near 0 latitude), a different point is seen for each "head position," at least in the middle of the screen. However, when a user looks down and turns around, the same point is seen from different positions. While it would be correct to show stereo information based on the user's head position, only one pixel at the poles of panoramic image. This is the limitation of every stereoscopic panoramic image. One solution here is to gradually fade out stereo effect (decrease interocular distance) when approaching the poles.

In summary, while the above embodiment achieves full coverage, it runs significantly more slowly and suffers from swirl artifacts near the poles.

Embodiments of the Invention

One embodiment of the invention includes techniques for the production of stereoscopic panoramic images in game engines which outperform the implementations described above in both quality and performance. This embodiment achieves or approaches real-time performance and may therefore be integrated in real-time production workflows.

As described above, the best solution for stereoscopic panorama production is ray casting, which achieves full coverage and eliminates swirl artifacts. However, ray casting is very different from how game engines currently render graphics. Instead of casting rays for each pixel with corresponding latitude/longitude angles, if the corresponding angles can be found for each vertex such that rotating the stereo setup with them will make the ray pass through the vertex, then the position of each vertex is known in the final panoramic map.

Figure 36A:
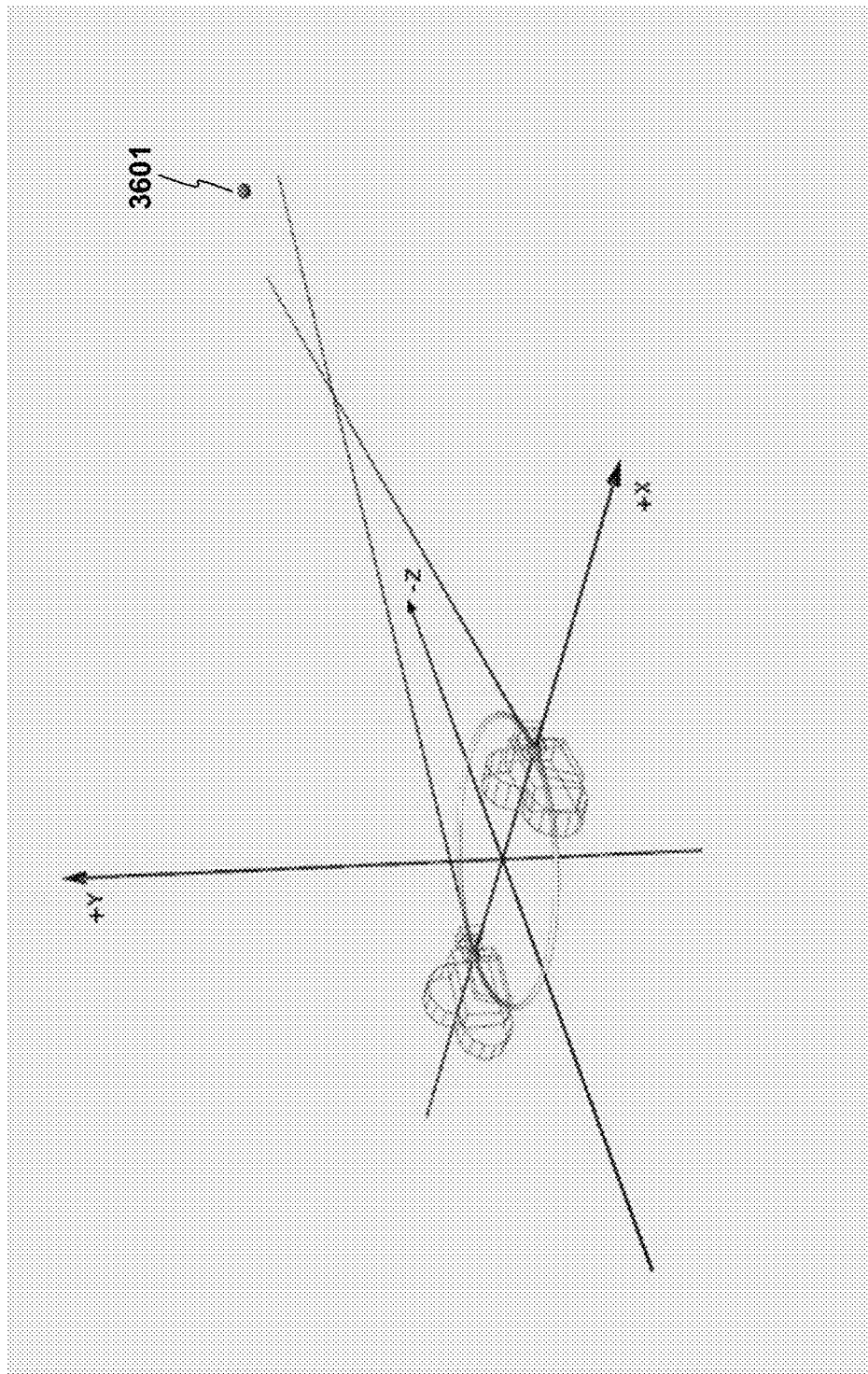
FIGS. 36A-B illustrate examples of stereo setup for cameras.
Figure 36B:
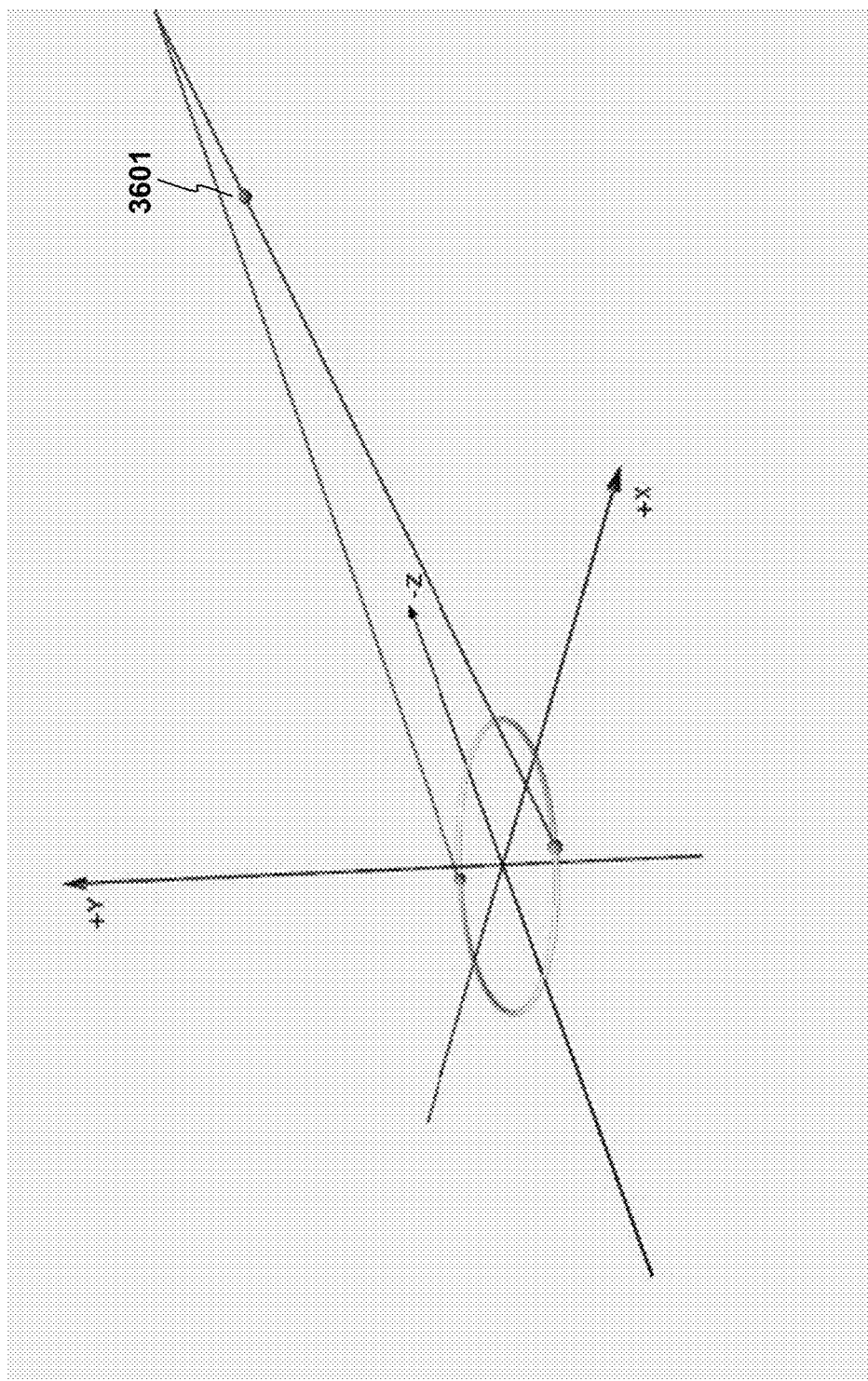

Consider the stereo setup in FIG. 36A and the vertex 3601 in space. One embodiment finds the latitude angle, $\theta$, that rotates the setup around the 'X' axis, and longitude angle, $\phi$, that rotates the setup around the 'Y' axis, such that the rays will traverse through the given point in space (e.g., a vertex) as in FIG. 36B. Of course, there will be different solutions for the left and right eye.

The following phenomenon is used to arrive at a solution. Consider the imaginary circle that is created by given point in space. Its center is on the Y axis, it is parallel to the X-Z plane and it goes through the given point. Then, after the stereo setup is lifted with $\theta$, for every $\phi$, the rays would traverse through the circle. This new constraint simplifies the solution greatly by decomposing it in two more simple separate problems: first find $\theta$, then find 4). One solution for this problem is described below in detail with respect to FIGS. 40A-C.

Note that there is a no-solution area shown in FIG. 37A which is the same area zoomed-out in FIG. 37B. While this area extends to infinity, it is nevertheless very small. It can be observed that this no-solution area is related to the geometry of the stereo setup (i.e., the interocular distance and zero parallax distance). As previously discussed, the ratio between the interocular distance and zero parallax distance should be between 1/20 and 1/30, so the area is very narrow (much narrower than presented in FIG. 37A-B). Moreover, the no solution area is located at poles, as described above, it is a good practice to fade out stereo effects near the poles by reducing the interocular distance, which will minimize the no solution area. So this area does not represent a problem in real-world implementations.

Vertex shaders usually project vertices from 3D space to a 2D plane. In the next rendering stage, the pixel shader will color each pixel according to vertex attributes interpolated between the vertices in the polygon (as well as other logic that can be added). The 2D plane in the output of the vertex shader has four coordinates and is called NDC space (for Normalized Device Coordinates). The first two is the 'X-Y' coordinates of the 2D plane, and the third coordinate, 'Z', contains information about the distance of the vertex from the camera which is normally used for correct occlusion calculations. The fourth coordinate, 'W', also contains some distance information and is used for accurate perspective dependent interpolation. The correct x-y position in the normalized range is obtained after normalizing the NDC by W, but the vertex shader has to output coordinates before normalization (e.g., gl_Position in OpenGL). In one embodiment, this information is recalled to reconstruct NDC without the use of the projection matrix.

An NDC is generated that corresponds to the panoramic image and position of each vertex in its place, corresponding to its latitude/longitude angles that were just found. While this is an operable solution, there may be large distortions near the poles, as everything between two vertices would be interpolated as straight lines instead of curves. Moreover, the discontinuity region will be realized at longitude=180 degrees (the "dateline" on a globe). Small polygons crossing the dateline will be stretched through the whole screen as some vertices would be projected to the right side of the map near the longitude=180 degrees and to the left side near longitude=−180 degrees. Polygons will never cross the poles as long as the vertex is not located exactly at the pole. Think of a setup where the camera is located at the origin (the Y axis up) and the polygon is comprised of the four symmetrical coordinates beneath: (5, −5, 5), (5, −5, −5), (−5, −5, 5) and (−5, −5, −5). In this case, the polygon would be represented in a panoramic map as a perfectly straight line and these would not be visible at all.

All this happens due to the fact that vertices comprising something of a spherical nature are projected (camera surroundings) to a rectangular plane. If instead of doing this the surroundings are projected to six planes of a cube surrounding the camera to generate a cubemap, and then the cubemap is converted to an equirectangular projection (as described above), this will solve all of the problems previously described as each side of the cube is a plane and therefore closely approaches what vertex shaders generally do—project the scene to a plane.

Figure 38A:
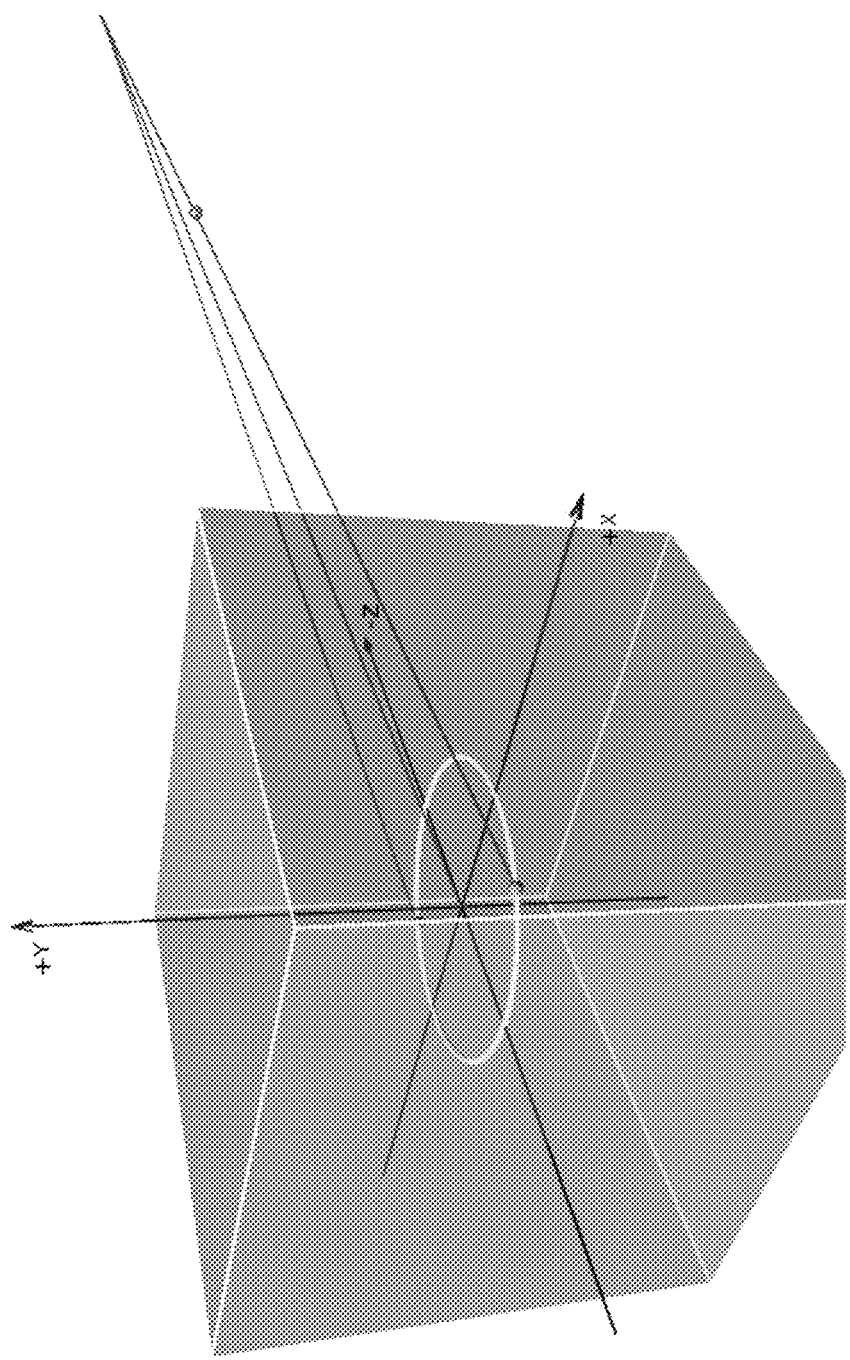
FIG. 38A illustrates how a normalized device coordinate may be obtained.

One embodiment implements the following workflow. For each vertex, the latitude/longitude is calculated. Then rotate the initial position of the stereo setup with the longitude angle to obtain the position of the right/left camera for stereo. The ray is now starting from camera and going through the vertex. The intersection of the ray is determined with one of the planes of the cubemap and an X-Y coordinate is retrieved for NDC from this intersection (as each cube side serves now as a screen). FIG. 38A illustrates the setup.

The size of the cube must be determined. It can be seen that because rays are not cast from the center, changing the distance of the planes from the origin affects final positions in NDC. The fact is that there is no such distance that gives correct result for all vertices. But the interesting thing to note is that if a zero-parallax distance is chosen, the obtained result is close to a correct one.

While there are distortions introduced, which are hardly discernable in scene geometry, they were observed to cause eye strain when observed through stereo device as compared to the same panoramic image obtained from Maya (e.g., by using raycast method of Domemaster3D plugin). Some who observed such panoramic images reported an unpleasant feeling of discomfort as if it was very difficult to focus on objects in the scene.

To address this issue, one embodiment does not only project vertices to the plane, but rather to position them in such a way that after a panoramic shader is applied (described above) the vertex will reach the calculated latitude/longitude position. For that purpose, one embodiment of the invention generates a ray positioned at the origin and pointing towards the −Z direction (i.e., an imaginary center camera). The ray is rotated with the obtained latitude/longitude values and the resulting ray is intersected with the cube sides. This is due to a fact that the applied panoramic shader assumes that the camera is at the origin and not shifted for stereo. Note that this ray will not path through the given vertex. When a ray is shot from the center, the plane distance has no meaning, since intersection would be at the same position after normalization.

Figure 38B:
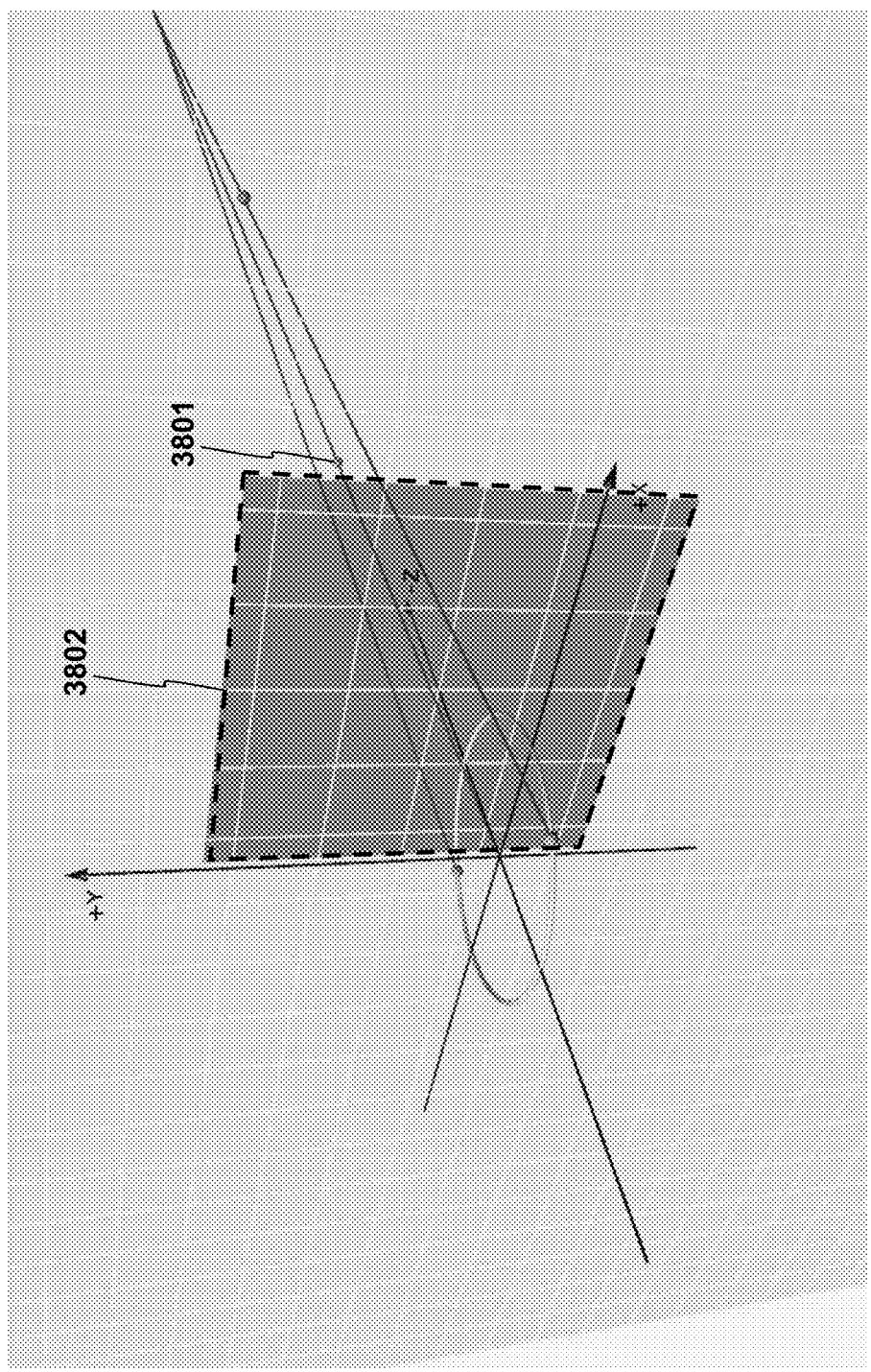
FIG. 38B illustrates a center camera ray that intersects a front cube plane.

FIG. 38B shows the center camera ray that intersects the front cube plane at a point marked by dot 3801. Note that although intersection is on the plane, represented by the grid, it is outside of the cube side 3802 (shown with a dotted line). This is acceptable as the vertex may fall outside of visible area. The shifted camera position still needs to be determined (i.e., positions for right and left cameras) as 'Z' and 'W' in NDC space should be calculated from where camera "shoots." Otherwise, the depth calculation would be incorrect and some objects that should be behind others will appear in front of them.

Also note that in order to simplify the solution the final projection may be solved only for the front cube plane. For other planes, the setup may be rotated such that the solution would be identical to the front plane solution. It is interesting to mention that culling of faces behind the camera is not required as they are projected to the plane with the negative W coordinate and hardware culls them automatically.

In one embodiment, each vertex is placed correctly in final latitude/longitude map, and the depth and W are calculated correctly. However, there are still problems with interpolation of large polygons. Since each one of the polygon vertices was "shot" from a different camera position, texture interpolation in the middle would be slightly different for the left and right solutions. This becomes obvious in the presence of other objects.

Figure 39B:
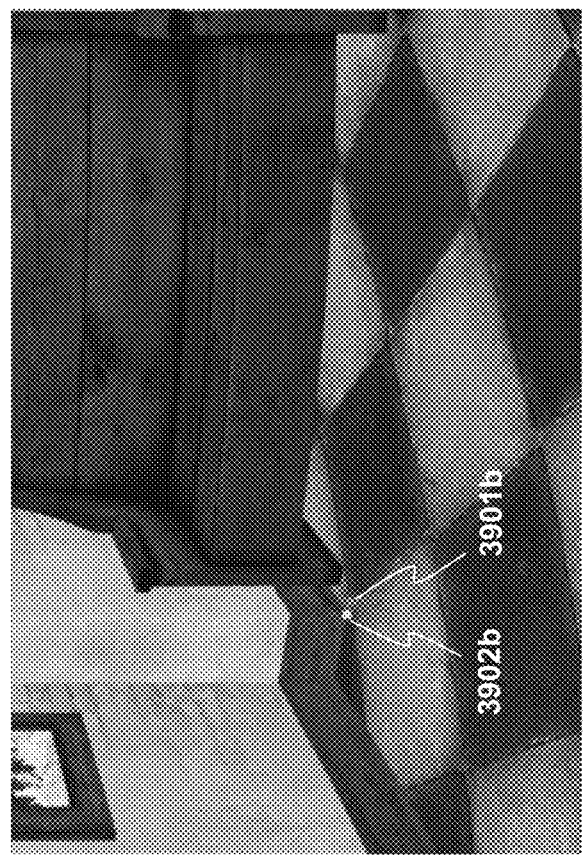
FIGS. 39A-B illustrate examples of left and right images of the same panorama.
Figure 39A:
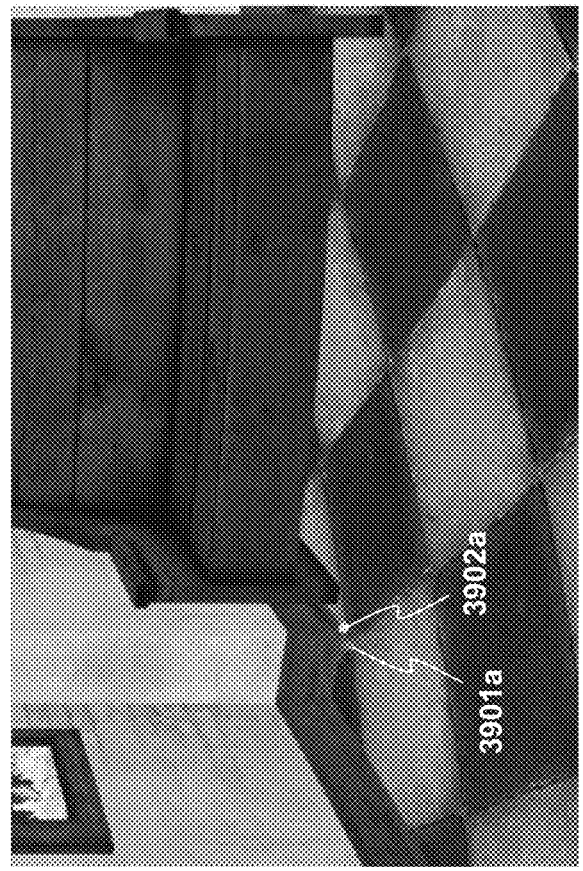

FIG. 39A and FIG. 39B illustrate example left and right images, respectively, of the same panorama. The floor in this scene is represented by very large polygons, larger than screen size. Dot 3901*a-b* marks tile corner and dot 3902*a-b* marks wall corner. Notice that in the left image, dot 3902*a* is to the right side of dot 3901*a*, while in the right image, dot 3902*b* is to the left of dot 3901*b*. In stereo, this creates an effect of incorrect depth, as if there is a gap between the wall and the floor while there is no such gap in a given scene.

One embodiment of the invention addresses this issue by tessellating large polygons to smaller ones. In addition, polygons located beneath and above the camera may be tessellated in order to create gradual fade-out for stereoscopy as was explained above. Modern graphics cards provide dynamic hardware-based tessellation for polygons, leveraging high parallelism of the GPU. Consequently, one embodiment does not tessellate the polygons manually, but rather integrates tessellation in workflow and applies the proper logic. Notice that the problem becomes less prominent not just when polygons become smaller but also as polygons are farther from the camera. This is because the interocular distance, which is responsible for the interpolation difference, becomes less significant.

In one embodiment, tessellation is applied to ensure that no polygon side is larger than some portion of the screen (e.g., 5%, 10%, etc). When utilizing all of the techniques described above, the obtained result demonstrated a 100% match with a stereoscopic panoramic image obtained from Maya using Domemaster3D.

Tessellation may have an impact on performance. If performance is an issue, scene models may be tessellated manually once, and then used for panorama production without the tessellation stage. Modern hardware is capable of processing a very large number of vertices in real time, so once loaded to the GPU, a manually tessellated scene will perform significantly faster than a dynamically tessellated scene. In addition, various optimization techniques may be employed in the embodiments of the invention starting from effective culling to multi-render targets that should allow rendering of six cube sides for the right and left eye in a single render call.

In summary, one or more of the following techniques may be employed to improve panoramic rendering:

(1) In one embodiment, either tessellated models or hardware tessellation is used such that no polygon side is larger than 10% of the screen.

Figure 40A:
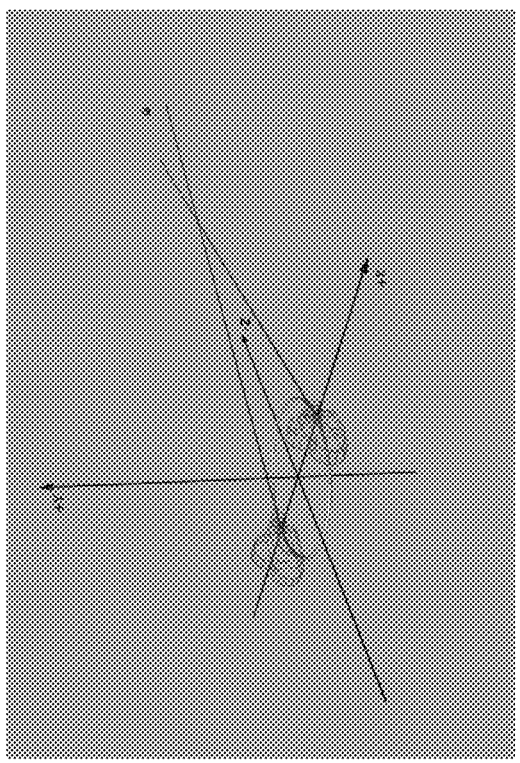
FIG. 40A-C illustrates one example of a distortion fixing fragment shader.
Figure 40B:
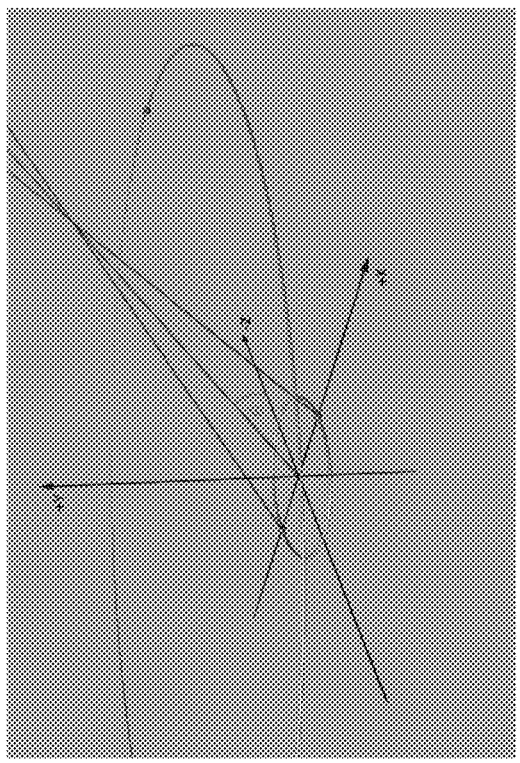
Figure 40C:
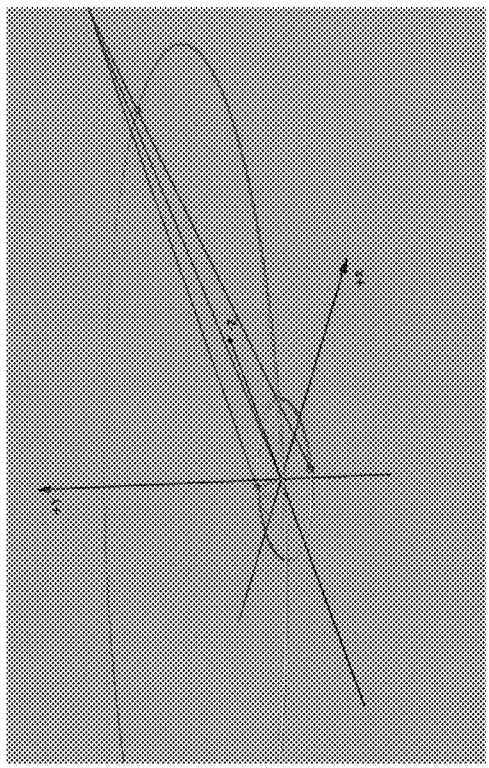

(2) For each vertex, the latitude/longitude angles are determined such that the stereo setup rotated with these angles will make the camera ray (for the desired virtual camera) pass through the vertex (see, e.g., solution described with respect to FIGS. 40A-C).

(3) An imaginary virtual center camera is rotated with obtained latitude/longitude, intersected with the front plane of the cubemap and the normalized X-Y coordinates obtained from the intersection based on the NDC.

(4) Determine the stereo camera position by rotating its original position with the longitude angle.

(5) Determine 'Z' and 'W' NDC coordinate components based on the obtained right/left camera position.

(6) The updated camera position may be passed to the fragment shader to improve light calculation.

(7) Operations 1 to 6 may be applied to each one of the six cube planes while each time the setup is rotated to match the front plane solution.

(8) A panoramic shader described above (see, e.g., FIGS. 18A through 24) is applied to convert the obtained cubemap to the equirectangular panoramic image.

(9) Operations 1 to 8 are applied to the second virtual camera.

Figure 41:
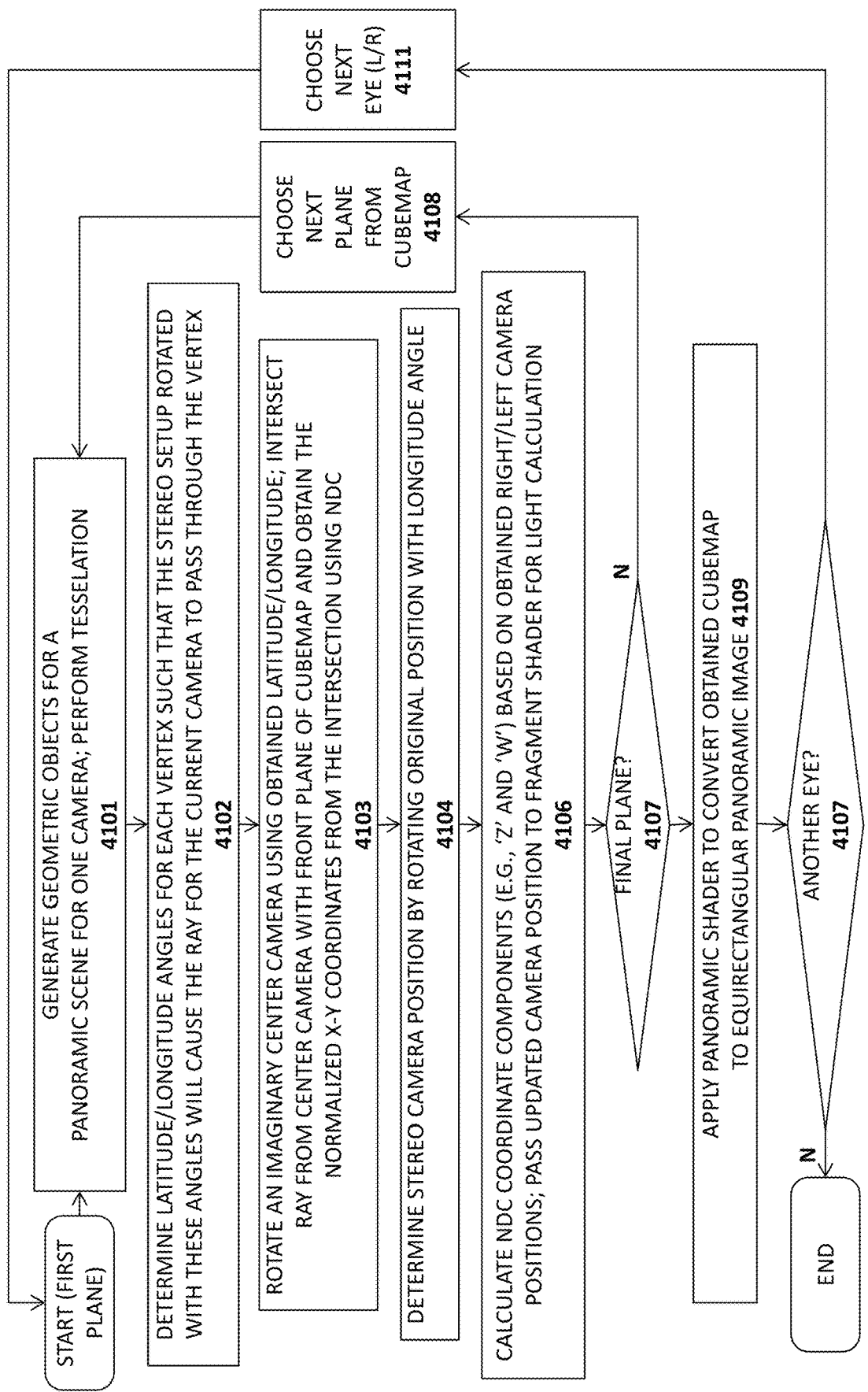
FIG. 41 illustrates example camera setups for capturing panoramic images.

One embodiment of a method for improving panoramic rendering is illustrated in FIG. 41. This method may be implemented within the context of the graphics architectures described above, bit is not limited to any particular graphics architecture.

Starting with the first plane of the cubemap, at 4101, geometric objects are generated for the current scene for one eye (e.g., the left eye) and tessellation is performed on the geometric objects. As mentioned, in one embodiment, either tessellated models or hardware tessellation is used to limit polygon sides.

At 4102, for each vertex, the latitude/longitude angles are determined such that the stereo setup rotated with these angles will make the camera/eye ray (for the desired eye/camera) pass through the vertex (see, e.g., solution described with respect to FIGS. 40A-C).

At 4103, an imaginary center camera/eye is rotated with obtained latitude/longitude, intersecting it with the front plane of the cubemap and obtaining the normalized X-Y coordinates (e.g., using NDC).

At 2404, the stereo camera/eye position is determined by rotating its original position with the longitude angle and at 2405 the updated camera position is passed to the fragment shader for light calculations. At 2405, the 'Z' and 'W' NDC coordinate components are determined based on the obtained right/left camera position; the updated camera position may optionally be passed to the fragment shader to improve light calculation.

If the current plane is not the final plane of the cubemap, determined at 4107, then the next plane is selected at 4108 and operations 4101-4106 are repeated. If the current plane is the final plane, then at 2409, a panoramic shader is applied to convert the obtained cubemap to an equirectangular image at 4109.

If the above set of operations have only been performed for one eye/camera, determined at 4107, then the next eye/camera (e.g., the right eye/camera) is selected at 4111 and the process repeats for each plane of the cubemap.

The benefits of these embodiments of the invention include the fact that full coverage of surroundings is achieved without undesirable artifacts at the poles (e.g., swirls). In addition, these embodiment enable smooth integration for OpenGL based rendering engines. If there is already a rendering engine producing panoramic images, the embodiments directed to stereo rendering may be performed by simply adding functions to the vertex shader that updates the camera position and calculates the NDC. If manual tessellation is not an option, a dynamic tessellation stage is also added. The above implementations perform much more efficiently than all other described techniques for game engines.

Raycast Matching Mathematical Solution

Consider the setups in FIGS. 40A-C. FIG. 41A shows initial position of stereo setup with left and right cameras and some point V in space represented by red dot. Let's call point components as (Vx, Vy, Vz). The problem is to find two angles θ and φ, for each camera, such that the ray casted from that camera will path through the point V. θ is an elevation angle obtained by rotating setup from its initial position around X axis (as in FIG. 2). φ is rotation around Z axis (FIG. 41C).

It is easy to show that after the setup is elevated with θ, then for every φ the rays would intersect a circle that lies on Y=Vy plane, goes through V and has Y axis at its center (the large circle in FIGS. 40B and 40C). This decomposes the problem in two more simple ones: find θ, then find φ.

Let's call the radius of the small circle as d, which corresponds to half of the interocular distance.

The rays in initial position will meet at "zero parallax" distance. Let's denote it by P. Also, let's denote by R the radius of the large circle (that goes through V).

Let's solve the problem for left eye. The solution for the right eye will be obtained simply by negating the d.

After lifting with θ intersection point would be at: (0, P sin θ, −P cos θ). A ray for left eye will start at: (−d, 0, 0), path through (x, y, z) that lies on a large circle and path through the intersection point. Those, we can write line's equation as:

$$(-d,0,0)+(d,P\sin\theta,-P\cos\theta)t=(x,y,z)$$

So we can write four equations with four unknowns while one of them is inside trigonometric function:

$$\begin{cases} 1. & x^2+z^2=R^2 \\ 2. & -d+dt=x \\ 3. & -tP\cos\theta=z \\ 4. & tP\sin\theta=V_y \end{cases}$$

Where the four unknown variables are: {x, z, t, θ}.

Extracting t from second equation and z from first brings 3 and 4 to the following form:

$$\begin{cases} -\dfrac{d+x}{d}P\cos\theta=\sqrt{R^2-x^2} \\ \dfrac{d+x}{d}P\sin\theta=V_y \end{cases}$$

Now we get two equations with two unknown variables. The x extracted from second equation above is given by:

$$x=\frac{V_y d-Pd\sin\theta}{P\sin\theta}$$

Now if we use it for first equation (of the latter two), raise both sides by a power of two and try to simplify we finally get the following equation:

$$P^2V_y^2\cos\theta^2=\sin\theta^2(R^2P^2-P^2d^2)+2Pd^2V_y\sin\theta-V_y^2d^2$$

Let's give a new names to the following constants:

$$\begin{cases} \alpha=P^2V_y^2 \\ \beta=-(R^2P^2-P^2d^2) \\ \gamma=-2Pd^2V_y \\ \delta=V_y^2d^2 \end{cases}$$

And then we get the following equation:

$$\alpha\cos\theta^2+\beta\sin\theta^2+\gamma\sin\theta+d=0$$

Remember that: $\cos\theta^2=1-\sin\theta^2$

Using this we get simple quadratic equation:

$$x^2(\beta-\alpha)+\gamma\sin\theta+\delta+\alpha=0$$

And its solutions is of course given by:

$$\sin\theta=\frac{-\gamma\pm\sqrt{\gamma^2-4(\beta-\alpha)(\delta+\alpha)}}{2(\beta-\alpha)}$$

This gives the elevation angle. Of course negative discriminant means no solution. Also it can be shown that for y>0 solution with "minus" is the right one and for y<0 we choose solution with "plus".

Substituting this into original equation gives us x and y of the intersection with large circle. Now the φ is just the angle between two dimensional vectors (x, z) and ($V_x$,$V_z$). It can be found by using dot product between them.

Note that solution can't be used for the case when θ=0 (i.e. no elevation). This is because we have zero in both sides of equation 4 in the original setup and we will get division by zero in the further stages of equation development.

However, solution for this case is pretty simple. We can write the line equation as:

$$(-d,0)+(d,-P)t=(x,z)$$

Which gives us three equations with three unknown variables:

$$\begin{cases} -d+dt=x \\ -Pt=z \\ x^2+z^2=R^2 \end{cases}$$

Substituting x and z from first two equations to a third one and simplifying it a bit gives the following:

$$(d^2+P^2)t^2-2d^2t+d^2-R^2=0$$

And its solution is:

$$t=\frac{2d^2+\sqrt{4d^4-4(d^2+P^2)(d^2-R^2)}}{2(d^2+P^2)}$$

Note that only solution with '+' will be good as t must be positive.

The embodiments described above provide efficient and high quality reprojection techniques which are particularly beneficial for rendering high frame rate multi-view displays, such as stereoscopic VR HMDs. In such systems, providing the required rate of pixels/samples per second is only possible with a heavy amortization of shading costs. Reprojection is one of the techniques which can be used to exploit the high temporal and spatial coherence of frames.

The terms "module," "logic," and "unit" used in the present application, may refer to a circuit for performing the function specified. In some embodiments, the function specified may be performed by a circuit in combination with software such as by software executed by a general purpose processor.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
receiving vertices of geometric primitives in a 3-D coordinate system;
determining a final location, equivalent to latitude and longitude coordinates, for each of the vertices in a panoramic image, wherein the determination comprises:
determining a set of one or more latitude angles and longitude angles based on a first ray projected out of a left virtual camera, the left virtual camera to be combined with a right virtual camera and a virtual center camera on a virtual stereo camera;
rotating the virtual center camera using the set of latitude and longitude angles; and
determining first normalized device coordinates (NDC) based on an intersection of a second ray projected from a virtual center camera with a cubemap plane for a cubemap representation of the panoramic image; and
rendering the panoramic image in accordance with the final location of each of the vertices.

2. The method of claim 1 wherein reverse ray casting techniques are implemented to perform the operation of determining the final location.

3. The method of claim 2 wherein the reverse ray casting techniques comprise determining an initial direction or latitude/longitude angles for a ray, given a point in a scene that the ray passes through.

4. The method of claim 1 further comprising:
rotating the stereo camera position by one or more of the longitude angles to determine current stereo camera position; and
determining second NDCs based on the determined stereo camera position.

5. The method of claim 4 wherein the first NDCs comprise X and Y NDCs and wherein the second NDCs comprise Z and W NDCs.

6. A non-transitory machine-readable medium having program code stored thereon which, when executed by a machine, causes the machine to perform the operations of:
receiving vertices of geometric primitives in a 3-D coordinate system;
determining a final location, equivalent to latitude and longitude coordinates, for each of the vertices in a panoramic image, wherein the determination comprises:
determining a set of one or more latitude angles and longitude angles based on a first ray projected out of a left virtual camera, the left virtual camera to be combined with a right virtual camera and a virtual center camera on a virtual stereo camera;
rotating the virtual center camera using the set of latitude and longitude angles; and
determining first normalized device coordinates (NDC) based on an intersection of a second ray projected from a virtual center camera with a cubemap plane for a cubemap representation of the panoramic image; and
rendering the panoramic image in accordance with the final location of each of the vertices.

7. The non-transitory machine-readable medium of claim 6 wherein reverse ray casting techniques are implemented to perform the operation of determining the final location.

8. The non-transitory machine-readable medium of claim 7 wherein the reverse ray casting techniques comprise determining an initial direction or latitude/longitude angles for a ray, given a point in a scene that the ray passes through.

9. The non-transitory machine-readable medium of claim 6 further comprising program code to cause the machine to perform the operations of:
 rotating the stereo camera position by one or more of the longitude angles to determine current stereo camera position; and
 determining second NDCs based on the determined stereo camera position.

10. The non-transitory machine-readable medium of claim 9 wherein the first NDCs comprise X and Y NDCs and wherein the second NDCs comprise Z and W NDCs.

11. A graphics processing apparatus comprising:
 a storage to store vertices of geometric primitives in a 3-D coordinate system;
 a vertex processor to determine a final location, equivalent to latitude and longitude coordinates, for each of the vertices in a panoramic image, wherein the determination comprises:
  determining a set of one or more latitude angles and longitude angles based on a first ray projected out of a left virtual camera, the left virtual camera to be combined with a right virtual camera and a virtual center camera on a virtual stereo camera;
  rotating the virtual center camera using the set of latitude and longitude angles; and
  determining first normalized device coordinates (NDC) based on an intersection of a second ray projected from a virtual center camera with a cubemap plane for a cubemap representation of the panoramic image; and
 a rendering engine to render the panoramic image in accordance with the final location of each of the vertices.

12. The graphics processing apparatus of claim 11 wherein reverse ray casting techniques are implemented to perform the operation of determining the final location.

13. The graphics processing apparatus of claim 12 wherein the reverse ray casting techniques comprise determining an initial direction or latitude/longitude angles for a ray, given a point in a scene that the ray passes through.

14. The graphics processing apparatus of claim 11 wherein the vertex processor is to further:
 rotate the stereo camera position by one or more of the longitude angles to determine current stereo camera position; and
 determine second NDCs based on the determined stereo camera position.

15. The graphics processing apparatus of claim 14 wherein the first NDCs comprise X and Y NDCs and wherein the second NDCs comprise Z and W NDCs.

* * * * *